(12) United States Patent
Jung

(10) Patent No.: US 7,910,159 B2
(45) Date of Patent: Mar. 22, 2011

(54) RADIAL MAGNETIC FIELD RESET SYSTEM FOR PRODUCING SINGLE DOMAIN SOFT MAGNETIC UNDERLAYER ON PERPENDICULAR MAGNETIC RECORDING MEDIUM

(75) Inventor: Hong-Sik Jung, Pleasanton, CA (US)

(73) Assignee: WD Media, Inc., San Jose, CA (US)

( * ) Notice: Subject to any disclaimer, the term of this patent is extended or adjusted under 35 U.S.C. 154(b) by 1542 days.

(21) Appl. No.: 11/145,197

(22) Filed: Jun. 3, 2005

(65) Prior Publication Data
US 2006/0286412 A1    Dec. 21, 2006

(51) Int. Cl.
*G11B 5/64*    (2006.01)
(52) U.S. Cl. .......................... 427/130; 428/826
(58) Field of Classification Search ............... 427/127, 427/130; 438/800, 810, 826; 29/603.01, 29/603.03; 365/50
See application file for complete search history.

(56) References Cited

U.S. PATENT DOCUMENTS

| | | | |
|---|---|---|---|
| 5,121,258 A * | 6/1992 | Chi et al. ...................... | 360/17 |
| 5,366,815 A | 11/1994 | Araki et al. | |
| 5,589,262 A | 12/1996 | Kiuchi et al. | |
| 5,815,342 A | 9/1998 | Akiyama et al. | |
| 5,942,342 A | 8/1999 | Hikosaka et al. | |
| 5,959,824 A * | 9/1999 | Schultz et al. .................. | 361/151 |
| 6,270,885 B1 | 8/2001 | Hokkyo et al. | |
| 6,531,202 B1 | 3/2003 | Litvinov et al. | |
| 6,548,194 B2 | 4/2003 | Hikosaka et al. | |
| 6,641,935 B1 | 11/2003 | Li et al. | |
| 6,660,357 B1 | 12/2003 | Litvinov et al. | |
| 6,723,457 B2 | 4/2004 | Tanahashi et al. | |
| 6,754,054 B2 | 6/2004 | Seigler et al. | |
| 6,777,113 B2 | 8/2004 | Trindade et al. | |
| 7,081,303 B2 | 7/2006 | Yasui et al. | |
| 7,105,239 B2 | 9/2006 | Oikawa et al. | |
| 7,153,596 B2 | 12/2006 | Tanahashi et al. | |
| 7,217,467 B2 | 5/2007 | Arai et al. | |
| 7,588,842 B1 | 9/2009 | Abarra et al. | |
| 2001/0038932 A1 | 11/2001 | Uwazumi et al. | |
| 2002/0028357 A1 | 3/2002 | Shukh et al. | |
| 2002/0086185 A1 | 7/2002 | Yasui et al. | |

(Continued)

FOREIGN PATENT DOCUMENTS

GB    0675484    *    3/1995

(Continued)

OTHER PUBLICATIONS

Yihong Wu, "Antiferromagnetically coupled hard/Ru/soft layers and their applications in spin valves", Applied Physics Letters, vol. 80, No. 23, Jun. 10, 2002, pp. 4413-4415.

(Continued)

*Primary Examiner* — Timothy H Meeks
*Assistant Examiner* — Tabassom Tadayyon Eslami

(57) ABSTRACT

A radial magnetic field reset apparatus including a housing having a cavity with a soft magnet rod disposed at its center and a permanent magnet disposed around the cavity. The cavity and thickness of the soft magnet rod are sized to permit a cassette of disks to be inserted into the housing with the soft magnet rod disposed within the inner diameter holes of the disks contained in the cassette. The soft magnet rod at the center of the housing attracts the magnetic field generated by the permanent magnet, which results in a substantially uniform, radial magnetic field inside the housing.

16 Claims, 33 Drawing Sheets

U.S. PATENT DOCUMENTS

| | | | |
|---|---|---|---|
| 2002/0136930 A1 | 9/2002 | Oikawa et al. | |
| 2003/0022023 A1 | 1/2003 | Carey et al. | |
| 2003/0138671 A1 | 7/2003 | Oikawa et al. | |
| 2004/0233565 A1* | 11/2004 | Arai et al. | 360/66 |
| 2004/0247945 A1 | 12/2004 | Chen et al. | |

FOREIGN PATENT DOCUMENTS

| | | |
|---|---|---|
| JP | 2001155321 | 6/2001 |
| JP | 2003162807 | 6/2003 |

OTHER PUBLICATIONS

Michael A. Seigler, "Use of a permanent magnet in the synthetic antiferromagnet of a spin-valve", Journal of Applied Physics, vol. 91, No. 4, Feb. 15, 2002, pp. 2176-2179.

S. Takenoiri et al., "Exchange-Coupled IrMn/CoZrNb Soft Underlayers for Perpendicular Recording Media", IEEE Transactions on Magnetics, vol. 38, No. 5, Sep. 2002, pp. 1991-1993.

Kiwamu Tanahashi et al., "Exchange-biased CoTaZr soft underlayer for perpendicular recording", Journal of Applied Physics, vol. 93, No. 10, May 15, 2003, pp. 8161-8163.

B.R. Acharya et al., "Anti-Parallel Coupled Soft Under Layers for High-Density Perpendicular Recording", IEEE Transactions on Magnetics, vol. 40, No. 4, Jul. 2004, pp. 2383-2385.

S.C. Byeon et al., "Synthetic Antiferromagnetic Soft Underlayers for Perpendicular Recording Media", IEEE Transactions on Magnetics, vol. 40, No. 4, Jul. 2004, pp. 2386-2388.

Toshio Ando et al., "Triple-Layer Perpendicular Recording Media for High SN Ratio and Signal Stability", IEEE Transactions on Magnetics, vol. 33, No. 5, Sep. 1997, pp. 2983-2985.

Manfred E. Schabes et al., "Micromagnetic Modeling of Soft Underlayer Magnetization Processes and Fields in Perpendicular Magnetic Recording", IEEE Transactions on Magnetics, vol. 38, No. 4, 1670, Jul. 2002.

M. Mallary et al., One Terabit per Square Inch Perpendicular Recording Concept Design, IEEE Transactions on Magnetics, vol. 38, No. 4, 1719, Jul. 2002.

H. Muraoka et al., Low Inductance and High Efficiency Single-Pole Writing Head for Perpendicular Double Layer Recording Media, IEEE Transactions on Magnetics, vol. 35, No. 2, 643, Mar. 1999.

S. Tanahashi et al., "A Design of Soft Magnetic Backlayer for Double-layered Perpendicular Magnetic Recording Medium", Journal of Magnetic Society in Japan, vol. 23 No. S2, 1999.

Jung et al., "FeTaN/IrMn Exchange-Coupled Multilayer Films as Soft Underlayers for Perpendicular Media", IEEE Transactions on Magnetics, vol. 37, No. 4, 2294, Jul. 2001.

Dimitri Litvinov et al., Recording Layer Influence on the Dynamics of a Soft Underlayer, IEEE Transactions on magnetics, vol. 38, No. 5, pp. 1994-1996, Sep. 2002.

Hitachi Metals America, Ltd., Materials Mag!c, 1994, 2004, 5 pages.

Morcos, Tony, "The Straight Attraction", Part One, Jun. 2000, Motion Control, pp. 29-33.

Ando, Toshio, Nishihara, Toshikazu, "Exchange-Coupled CoZrNb/CoSm Underlayer for Perpendicular Recording Media", IEEE Transactions on Magnetics, vol. 37, No. 4, Jul. 2001, pp. 1228-1233.

Tanahashi, Kiwamu et al., "Reduction of spike noise in perpendicular recording media by using MnIr antiferromagnetic films", Perpendicular Recording I, Journal of Applied Physics, vol. 91, No. 10, May 15, 2002, pp. 8049-8051.

Watanabe, S., et al., "Recording Performance of Double-Layered Perpendicular Recording Media With an Antiferromagnetic Layer", IEEE Transactions on Magnetics, vol. 39, No. 5, Sep. 2003, pp. 2288-2290.

Jiang et al., Recording Performance Characteristics of Granular Perpendicular Media, IEEE Transactions on magnetics, vol. 41, No. 2, 587, Feb. 2005.

* cited by examiner

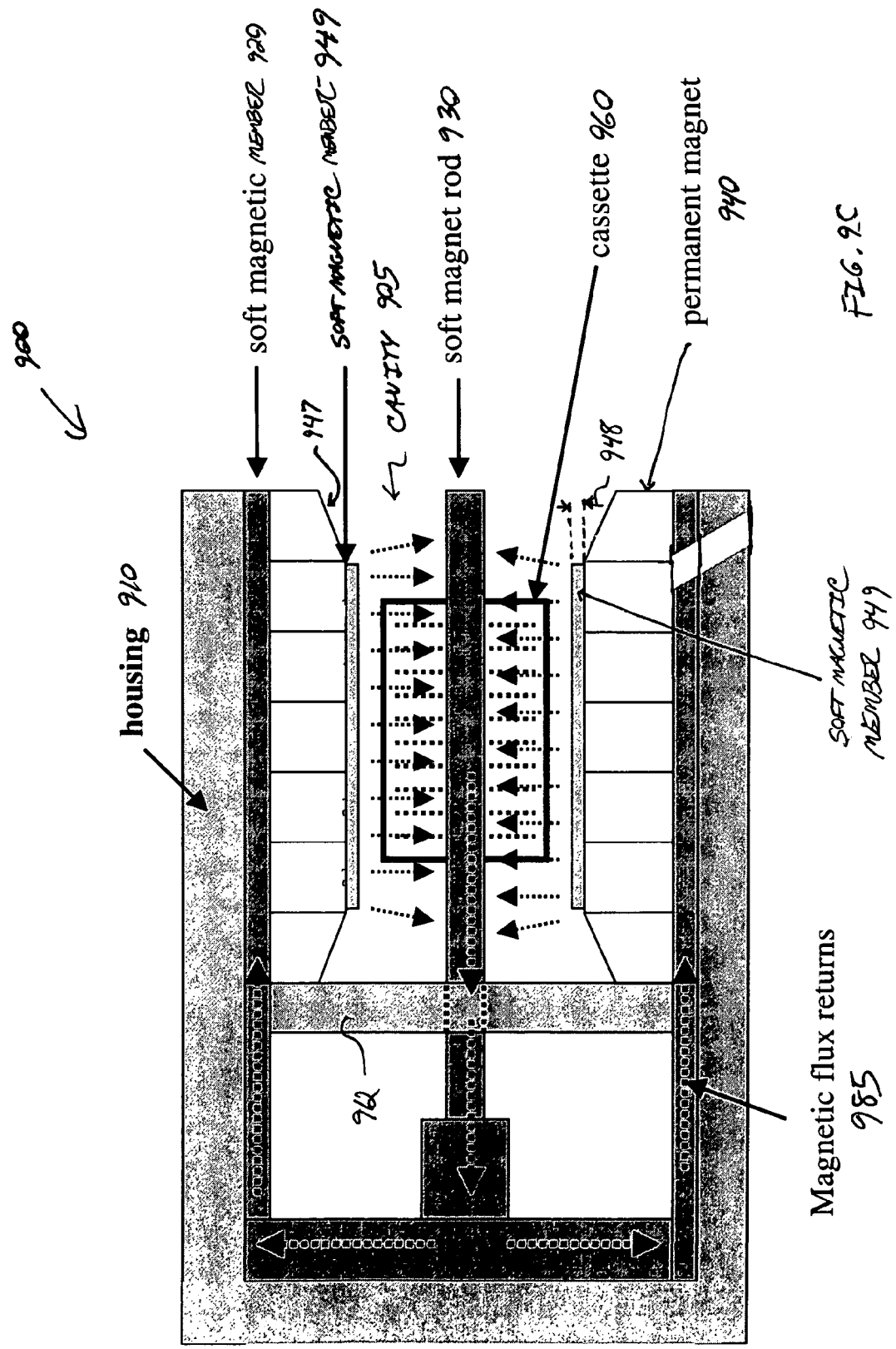

RADIAL MAGNETIC FIELD RESET SYSTEM FOR PRODUCING SINGLE DOMAIN SOFT MAGNETIC UNDERLAYER ON PERPENDICULAR MAGNETIC RECORDING MEDIUM

TECHNICAL FIELD

This invention relates to the field of disk drives and, more specifically, to tools used in the manufacture of to perpendicular magnetic recording disks.

BACKGROUND

Perpendicular magnetic recording systems have been developed to achieve higher recording density than may be possible with longitudinal magnetic recording systems. FIG. 1A illustrates portions of a conventional perpendicular magnetic recording disk drive system. The disk drive system has a recording head that includes a trailing write pole, a leading return (opposing pole) magnetically coupled to the write pole, and an electrically conductive magnetizing coil surrounding the yoke of the write pole. The bottom of the opposing pole has a surface area greatly exceeding the surface area of the tip of the write pole. To write to the magnetic recording disk, the recording head is separated from the magnetic recording disk by a distance known as the flying height. The magnetic recording disk is rotated past the recording head so that the recording head follows the tracks of the magnetic recording media. Current is passed through the coil to create magnetic flux within the write pole. The magnetic flux passes from the write pole, through the disk, and across to the opposing pole. Conventional perpendicular recording disks typically include a magnetic recording layer in which data are recorded, and a soft magnetic underlayer (SUL). The SUL enables the magnetic flux from the trailing write pole to return to the leading opposing pole of the head with low impedance, as illustrated by the head image of FIG. 1A. A relatively thick SUL, for example, approximately 40-200 nanometers (nm) is needed to facilitate magnetic flux return to the leading opposing pole of the head with low impedance. SULs that are too thin or have too low magnetization show saturated regions on the bottom of SUL where significant amounts of magnetic charge are formed, which result in magnetic flux leakage and poor SUL performance. Further increase in SUL thickness greater than 200 nm leads to better magnetic flux containment but spatial oscillations of magnetization inside the SUL can induce magnetostatically driven vortex structures corresponding to SUL-induced write noise, as discussed in Manfred E. Schabes et al., Micromagnetic Modeling of Soft Underlayer Magnetization Processes and Fields in Perpendicular Magnetic Recording, IEEE Transactions on Magnetics, Vol. 38, No. 4, 1670, July 2002. The SUL thickness also depends on the type of write heads. To use of shielded pole write heads as proposed in M. Mallary et al., One Terabit per Square Inch Perpendicular Recording Concept Design, IEEE Transactions on Magnetics, Vol. 38, No. 4, 1719, July 2002, can reduce the SUL thickness requirement up to 50% compared to an unshielded pole design.

Perpendicular recording disks should have much narrower $PW_{50}$ than is currently observed in longitudinal recording disks because in a perpendicular recording layer all of the magnetic easy axes are aligned in the perpendicular direction, i.e. the direction of recording. With this perpendicular recording type of media, the SUL is intended to serve as a flux concentrator to provide a sharp head field gradient so that narrow transitions can be written. The SUL, however, contains magnetic structures that are fully exchange coupled and, as such, any magnetization transition present in the SUL will be at least as broad as a typical domain wall width (e.g., 100 to 500 nm), illustrated in FIG. 1B. Such a domain wall provides stray fields much stronger than the fields from the recording layer, which causes typically spike noise. Reversed magnetic domains are usually observed due to the strong demagnetization fields along the edges of a disk.

A SUL with a high permeability is desirable because it enhances head field strength and gradient during the writing process. However, a SUL with too high permeability can cause saturation of the read head elements, exhibits a high sensitivity to stray fields higher than the coercivity ($H_c$) of the SUL, and increases wide area adjacent track erasure as well as magnetic domain noise. The induced anisotropy field ($H_k$) of the soft, ferromagnetic (FM) layer in most SULs can be lost at an elevated temperature under stray fields. This may result in reduced permeability along the circumferential direction and cause poor SUL performance with jittery time response to a drive write field, as discussed in Dimitri Litvinov et al., Recording Layer Influence on the Dynamics of a Soft Underlayer, IEEE Transactions on Magnetics, Vol. 38, No. 5, 1994, September 2002. Thus, thermal stability requires that $H_k$ does not vanish at a maximum disk operation temperature of approximately 100° C. Simulation results showed that the sensitivity to stray fields was greatly reduced with little effect on recording performance if the permeability of the SUL was reduced to 100, as discussed in H. Muraoka et al., Low Inductance and High Efficiency Single-Pole Writing Head for Perpendicular Double Layer Recording Media, IEEE Transactions on Magnetics, Vol. 35, No. 2, 643, March 1999. The production of a low noise SUL while maintaining a single domain state, medium permeability along the circumferential direction, magnetic stability from stray fields and thermal stability has been a difficult goal to achieve due to the high cost and complex manufacturability of current solutions.

One solution has involved the use of a triple layer structure having a Cobalt Samarium (CoSm) hard magnetic pinning layer, as discussed in U.S. Pat. No. 6,548,194 and Toshio Ando et al., Triple-Layer Perpendicular Recording Media for High SN Ratio and Signal Stability, IEEE Transactions on Magnetics, Vol. 38, No. 5, 2983, September 1997. The triple layer structure includes a CoCrTa perpendicular recording layer, a CoZrNb soft magnetic layer, and a CoSm layer that pins the magnetic domains in the SUL and provides a single domain state. This single domain situation was only maintained, however, when the effect of the CoSm pinning layer on exchange coupling was dominant. It required a relatively thick CoSm thickness of 150 nm. Furthermore, reversed edge magnetic domains of CoSm/CoZrNb were still present due to strong demagnetization fields along the edges of the disk, which was caused by ferromagnetic configurations in CoSm/CoZrNb exchange coupled films. If a thin hard magnetic (HM) layer is used, the HM/FM bilayer will show typical uniaxial switching characteristics with a relatively high coercivity for a soft FM layer due to strong ferromagnetic coupling with the HM layer. This, in turn, will result in a loss of single remanent magnetization state and loss of the exchange bias field ($H_{eb}$), i.e., a shift of the hysteresis loop in a minor hysteresis loop measurement. Magnetic orientation of the SUL depends entirely on the magnetic orientation of the HM used.

Another solution to reducing spike noise that originates from domain walls in the SUL in the presence of stray fields in the disk drive is through the use of an antiferromagnet (AF) pinning layer either between the SUL and the substrate or in an $[AF/FM]_n$ multilayer structure. Either a structurally disordered AF of Iron Manganese (FeMn) and Iridium Manganese (IrMn) or a structurally ordered AF of Platinum Manganese (PtMn), Palladium Platinum Manganese (PdPtMn), and Nickel Manganese (NiMn) can be used as an AF pinning layer. Unidirectional uncompensated interfacial magnetic moments of the AF are induced along the magnetization direction of the SUL during film deposition or via a post annealing process, as discussed, for example, in U.S. Pat. No. 6,723,457, S. Tanahashi et al., A Design of Soft Magnetic Backlayer for Double-layered Perpendicular Magnetic Recording Medium, Journal of Magnetic Society in Japan, Vol. 23 No. S2, 1999, and Jung et al., FeTaN/IrMn Exchange-Coupled Multilayer Films as Soft Underlayers for Perpendicular Media, IEEE Transactions on Magnetics, Vol. 37, No. 4, 2294, July 2001. An ordered AF having better thermal stability than a disordered AF requires an annealing process, at 250-280° C. for 2-5 hours with an orienting field of >1 kiloOersted (kOe), to achieve a face-centered tetragonal AF phase. Thus, a disordered AF is preferred in order to get $H_{eb}$ without additional annealing. Since $H_{eb} \propto 1/t_{FM}$ where $t_{FM}$ is the thickness of soft FM layer, the hysteresis loop can be shifted by decreasing $t_{FM}$ until $H_{eb} > H_c$. This results in a unique single remanent magnetization state to which the system returns after any field cycle. The magnetization perpendicular to the pinned direction is highly reversible, a key requirement for prevention of domain wall formation. With such a solution, the single domain state of the SUL is achieved by an exchange coupling with the AF pinning layer and is independent on stray fields. FeMn has poor corrosion resistance and low blocking temperature ($T_B$) of 150° C., where $T_B$ is the temperature at which $H_{eb}$ becomes zero. However, IrMn exhibits sufficient corrosion resistance and $T_B$ and, thus, can be used in recording media, as discussed in S. Takenoiri et al., Exchange-Coupled IrMn/CoZrNb Soft Underlayers for Perpendicular Recoding Media, IEEE Transactions on Magnetics, Vol. 38, No. 5, 1991, September 2002. However, IrMn is so expensive that it can significantly increase manufacturing cost. Another problem associated with using IrMn is that it still requires an additional field annealing process to induce a uniform $H_{eb}$ along the radial direction. Furthermore, demagnetizing fields that are relatively weaker than that in HM/FM layer structures still exist along the edges of the disk. Therefore, there is a possibility of forming reversed domains along the edges of a disk.

Another approach has involved the use of synthetic antiferromagnetic (SAF) coupled film structures. SAF coupled film structures originally developed for use in magnetic read sensors and longitudinal recording media are being used in perpendicular recording media to reduce edge demagnetization fields, improve robustness to stray fields, and enhance thermal stability. The SAF structures utilize a Ruthenium (Ru) spacer layer between two soft FM exchanged coupled layers, for example, composed of Cobalt Tantalum Zirconium (CoTaZr) or Iron Cobalt (FeCo). The Ru interlayer induces SAF coupling between the soft FM layers. In order to achieve an easy magnetization, a radial magnetic field of sufficiently high strength and uniformity distributed along the radial direction is necessary during film deposition. A SAF structure with equal soft FM layer thickness, however, may not hold a single domain state because of the same switching priority after removal of magnetic fields. A SAF structure with non-equal soft FM layer thickness aids magnetic alignment while maintaining a single domain state and increases $H_{eb}$ in the top soft FM layer closest to the magnetic recording layer resulting in reduction of adjacent track erasure, as discussed in B. R. Acharya et al., Anti-Parallel Coupled Soft Underlayers for High-Density Perpendicular Recording, IEEE Transactions on Magnetics, Vol. 40, No. 4, 2383, July 2004. However, undesired magnetic domain walls are easily induced because of a low $H_c$ in a thicker bottom soft FM layer. A SAF structure with a thinner top layer requires a pinning layer for the thicker, bottom soft FM layer, as discussed below.

The general pinning concept was originally developed for use in spin valve heads. A typical spin valve head consists of an AF layer coupled to the FM pinned layer, a spacer layer, and a soft free FM layer. The most common AF materials used are PtMn, PdPtMn, and IrMn. As previously discussed, these materials are expensive and generally more susceptible to corrosion. In order to replace such expensive AF layer materials with an inexpensive permanent magnet, a structure having a permanent magnet, spacer layer, and FM pinned layer was developed, for example, as discussed in U.S. Pat. No. 6,754,054, Michael A. Seigler et al., Use Of A Permanent Magnet In The Synthetic Antiferromagnetic Of A Spin-Valve, Journal of Applied Physics, vol. 91, No. 4, 2176, February 2002, and Yihong Wu et al., Antiferromagnetically Coupled Hard/Ru/Soft Layers and Their Applications In Spin Valves, Applied Physics Letters, vol. 80, No. 23, 4413, June 2002. Such references discuss the use of CoCrPt as the HM layer, Ru as the spacer layer, and CoFe or NiFe as the soft magnetic pinned layer. In particular, Wu et al. discusses a series of experiments that were carried out to study the dependence of $H_{eb}$ on the thickness of the CoFe and NiFe layers. It was reported that such structures exhibited a higher $H_{eb}$ and better thermal stability than IrMn or PtMn pinning layer structures. FIG. 1C illustrates the magnetization M (memu/cm$^2$) versus the field H (kOe) loops of a structure of Cr(4)/CoCrPt(8)/Ru (0.8)/CoFe(t) with the thickness t=2, 3.5, and 6 nm, respectively. The results of the experiments illustrated in FIG. 1C show that the magnetic exchange coupling of the CoCrPt/Ru/CoFe (HM pinning layer/space layer/soft FM pinned layer) structure changed from antiferromagnetic to ferromagnetic coupling as the CoFe pinned layer thickness was increased from 2 to 6 nm. The SAF coupling was only observed, however, when the CoFe pinned layer was less than 6 nm thick. A less than 6 nm thickness layer would not be suitable for use in a SUL for perpendicular magnetic recording disks that typically require a thickness in the range of 40-200 nm. The lose of SAF coupling strength at 6 nm is not surprising because it was reported that the interfacial exchange energy ($J_{AF}$) very rapidly decreased above 5 nm thickness, as discussed in S. C. Byeon et al., Synthetic Antiferromagnetic Soft Underlayers for perpendicular Recording Media, IEEE Transactions on Magnetics, Vol. 40, No. 4, 2386, July 2004, and it also exhibited a large $H_c$ of 120 Oe in 6 nm-thick CoFe. Both a reduction of $J_{AF}$ and an increase in $H_c$ will contribute to ferromagnetic configuration. In order to enhance $H_{eb}$, a thin (0.5-2 nm) CoFe film was inserted between the CoCrPt pinning layer and the spacer Ru layer resulting in a CoCrPt/CoFe/Ru/CoFe structure. This decreased the $H_c$ of the CoCrPt/CoFe layer stack, which was found to be deleterious for read sensor applications.

As previously mentioned, in order to reduce media noise, it is important for the SUL to maintain a single domain state as well as optimized permeability along the circumferential direction. In some conventional sputtering processes, radial magnetic fields of 200 to 500 Oe generated from magnets in the magnetrons of a sputtering system are applied to a disk, as discussed in discussed in K. Tanahashi et al., Exchange-biased CoTaZr Soft Underlayer for Perpendicular Recoding, J. Applied Physics, Vol. 93, No. 10, 8161, May 2003. While in other conventional processes, radial magnetic fields of up to 1000 Oe are applied to a disk during a post SUL deposition annealing process. A single domain situation, however, may not be obtainable by disk processing in an as-sputtered state due to the stray fields from the cathodes using either a permanent magnet or electromagnet during film deposition.

Another approach to maintaining a single domain state of an SUL is to deposit permanent magnet ring-shaped bands around the SUL on the disk in order to permanently bias the SUL, for example, as discussed in U.S. Pat. No. 6,531,202. FIG. 1D illustrates the perpendicular recording disk described in U.S. Pat. No. 6,531,202, having a ring shaped SUL 14 deposited on the disk 10 between an inner permanent magnet ring-shaped band 26 and an outer permanent magnet ring-shaped band 28. The permanent magnet bands 26 and 28 are deposited on the disk in the presence of a radial magnetic field that causes net remanent magnetization in the magnetic bands to be aligned radially which, in turn, creates a radially distributed magnetic field in the plane of the disk substrate between the bands. The permanent magnet ring-shaped field bands 26 and 28 generate a magnetic field in excess of 10 Oe, more preferably in excess of 50 or 60 Oe. The SUL 14 is brought into a single domain state by the generated magnetic field.

Another post-processing approach to achieving a single domain state of an SUL involves positioning a circular magnet in close proximity to a finished (i.e., completely fabricated) disk to generate the radial magnetic field. However, the radial field strength at a certain distance between a disk and a circular magnet for minimizing out-of-plane magnetic fields is typically weak, less than 300 Oe. The field distribution is not uniform even in a short radial field zone. A problem with the conventional single domain state schemes discussed above is that they are performed on an individual disk, resulting in low production rate.

BRIEF DESCRIPTION OF THE DRAWINGS

The present invention is illustrated by way of example and not limitation in the figures of the accompanying drawings, in which:

FIG. 9C is a cross sectional view illustrating an alternative embodiment of a radial magnetic field reset apparatus.

DETAILED DESCRIPTION

Figure 1A:
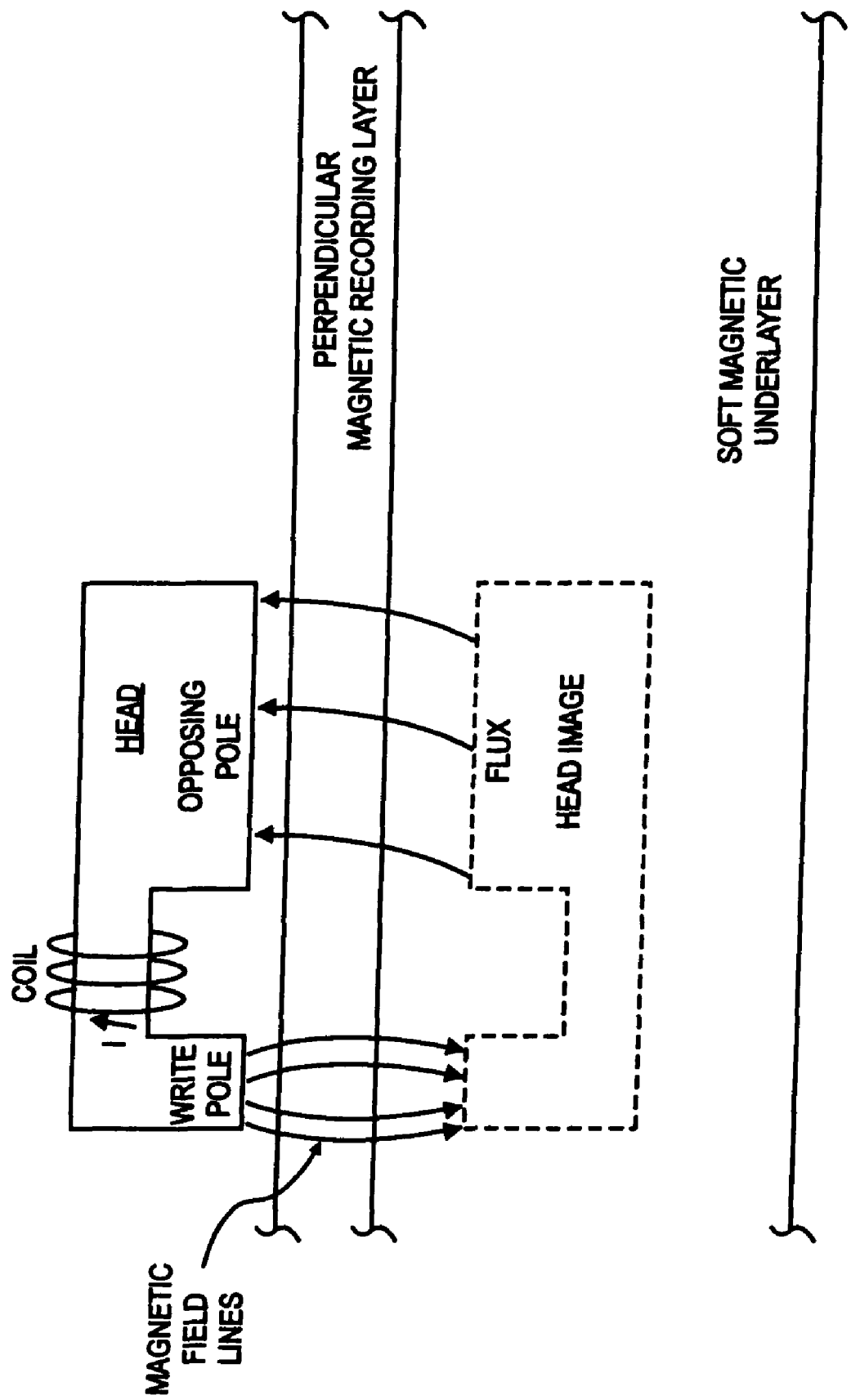
FIG. 1A illustrates a conventional perpendicular recording disk drive system.
Figure 1B:
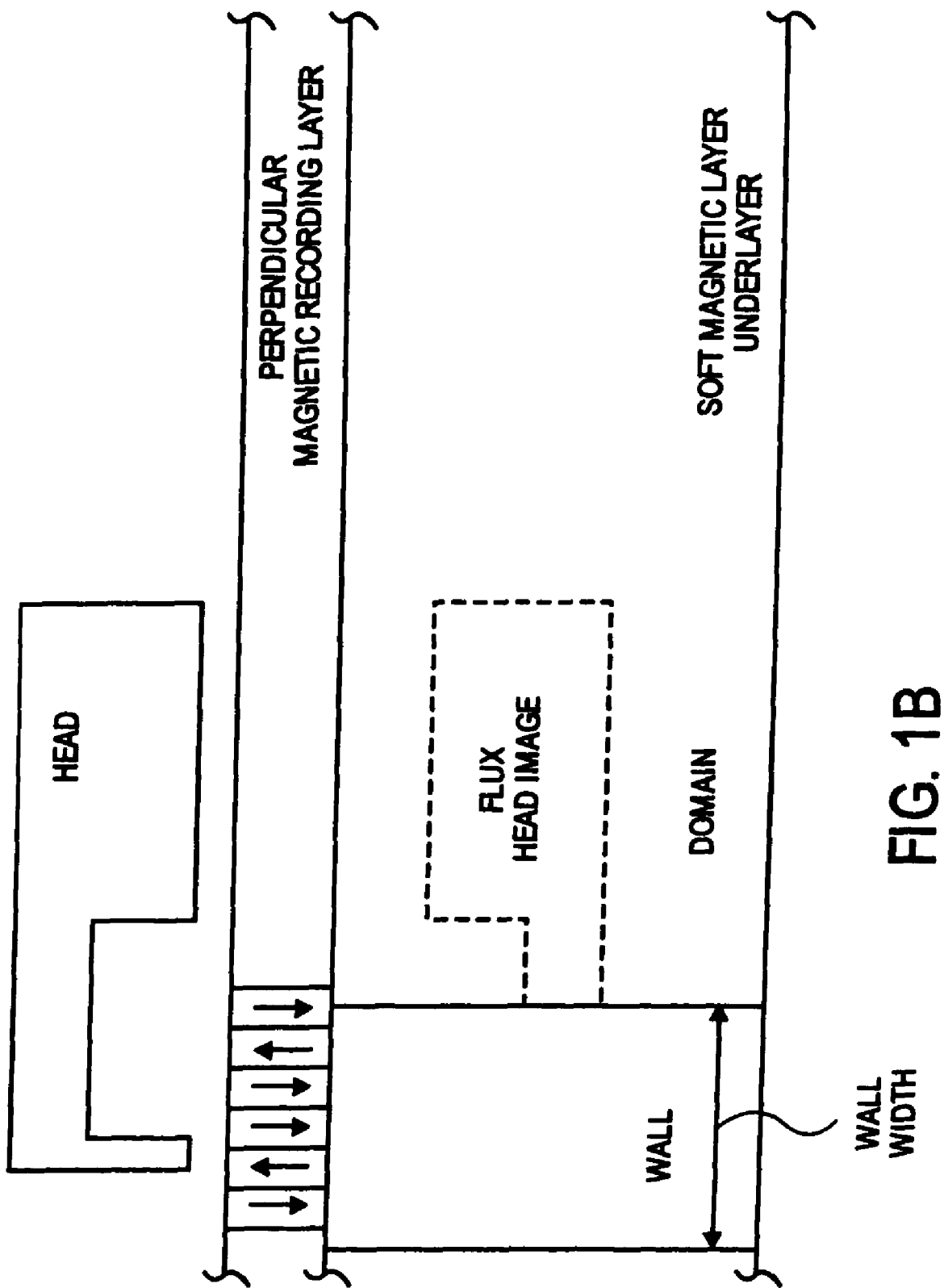
FIG. 1B illustrates domain wall effects in a conventional perpendicular recording disk drive system.
Figure 1C:
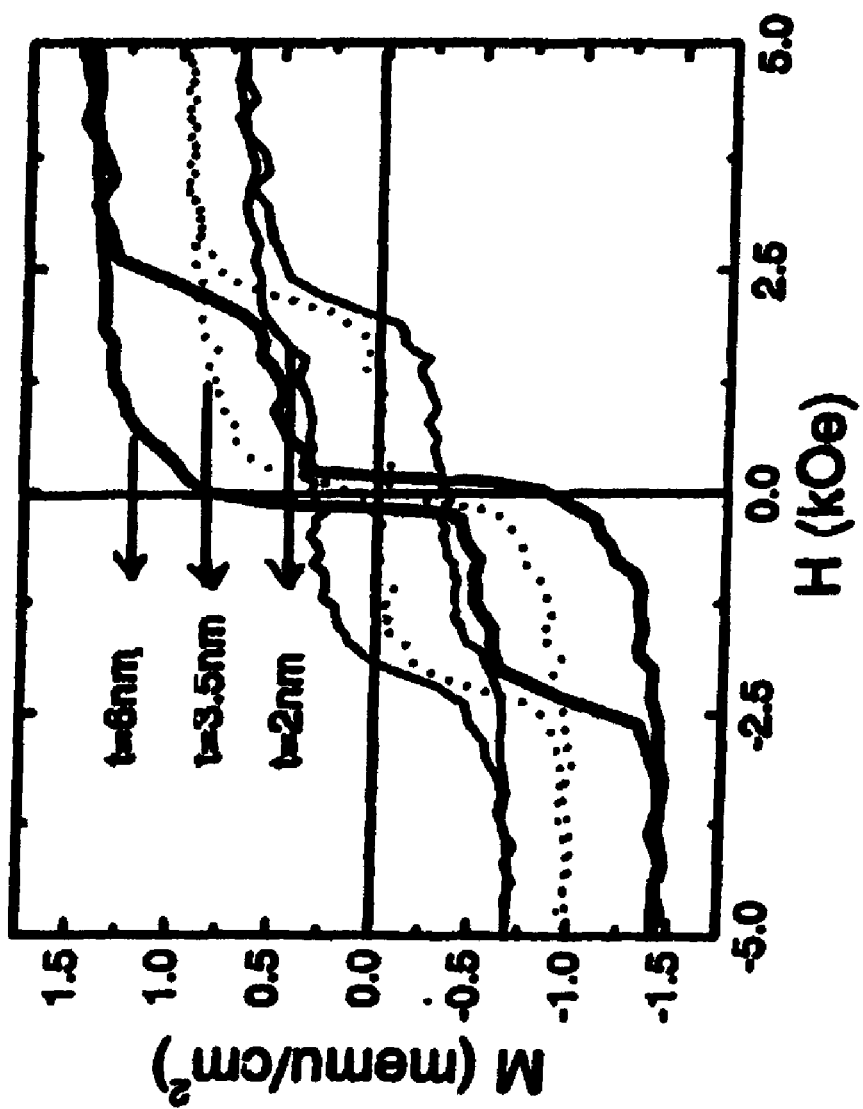
FIG. 1C illustrates M-H loops of the pinned layer in a prior art spin valve structure.
Figure 1D:
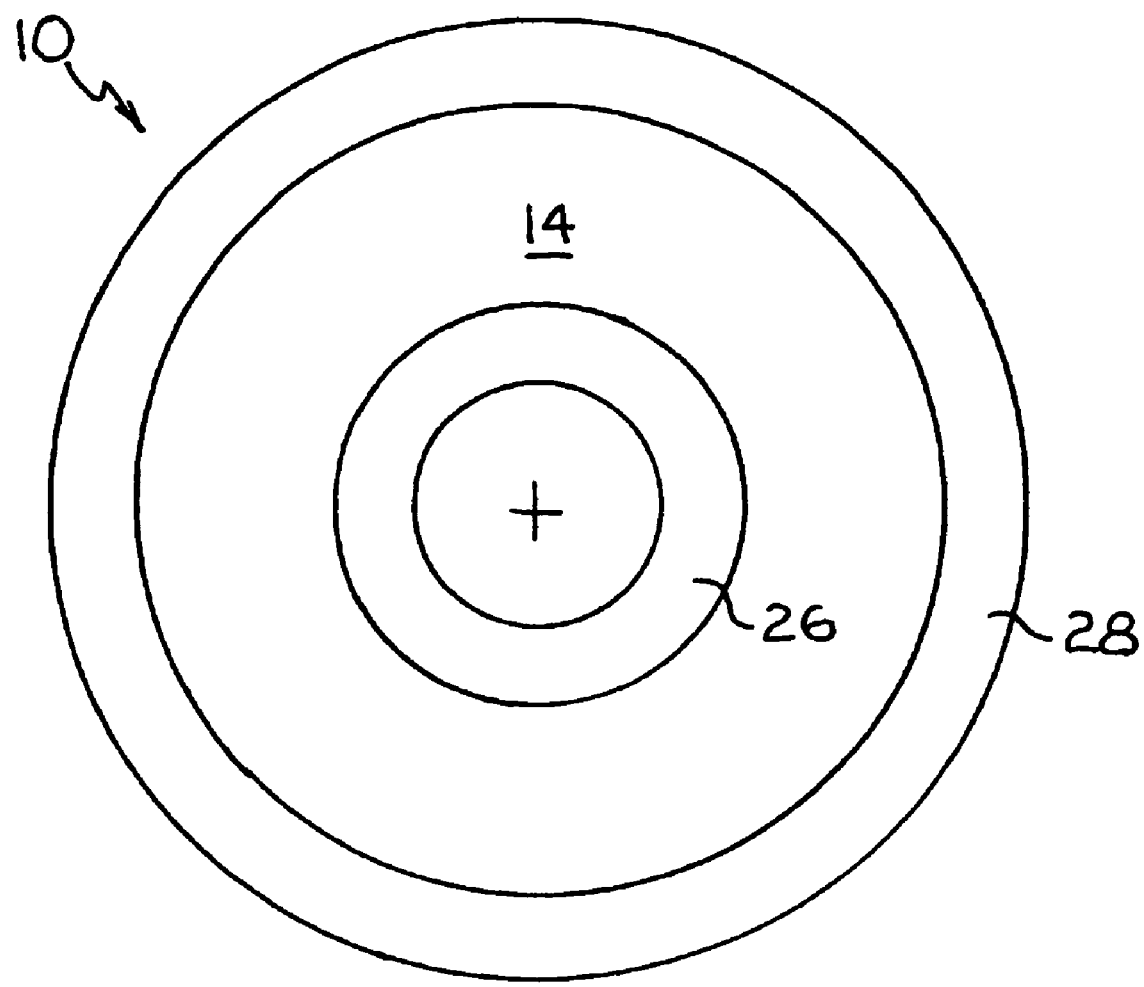
FIG. 1D illustrates a conventional perpendicular recording disk having a ring shaped soft magnetic underlayer deposited on a disk between inner and outer permanent magnet ring-shaped bands.

In the following description, numerous specific details are set forth such as examples of specific materials, components, dimensions, etc. in order to provide a thorough understanding of embodiments of the present invention. It will be apparent, however, to one skilled in the art that these specific details need not be employed to practice embodiments of the present invention. In other instances, well-known components or methods have not been described in detail in order to avoid unnecessarily obscuring embodiments of the present invention.

The terms "above," "below," "on," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers. Further the term "underlayer" is used herein to refer to a position relative to the magnetic recording layer. As such, there may be one or more other layer(s) disposed between the underlayer and the magnetic recording layer. In addition, the term "film" as used herein may refer to one or more layers of material.

"Hard" or "soft" media can make up the layers in a perpendicular magnetic recording disk. A hard magnetic recording layer, acting as the data layer, may have large coercivity (e.g., approximately >3 kOe) along the out-of-plane direction with low exchange coupling between grains. A soft magnetic layer, on the other hand, may have relatively low coercivity, for example, approximately less than <30 Oe along the easy axis and approximately less <5 Oe along the hard axis. A hard magnetic (HM) pinning layer for a SUL may have coercivity in approximately a range of >50 Oe to less than 7 kOe along the in-plane direction with high exchange coupling between grains. Materials providing a soft magnetic layer may be used in conjunction with a hard magnetic layer to achieve improved performance as discussed below.

A perpendicular magnetic recording disk with a magnetically resetable single domain soft magnetic underlayer is described. It should be noted that a single domain state is an approximation that applies to materials without any magnetic defects. The perpendicular magnetic recording disk may be used in a disk drive system that typically includes a read-write head. The head includes a trailing write pole, a leading return (opposing pole) magnetically coupled to the write pole. The SUL that resides underneath the hard magnetic recording layer is used in order to form a magnetic circuit with the head. The SUL provides a path for magnetic flux that flows to or from the head. The SUL with a HM-biased synthetic antiferromagnetically or ferrimagnetically coupled soft FM pinned film for a perpendicular magnetic recording disk may be composed of the following layers: a substrate; seed layer (e.g., comprising Cr); a HM pinning layer (e.g., comprising a Co based alloy); an antiferromagnetic coupling inducing (AI), spacer layer (e.g., comprising Ru); and a soft FM pinned film. In one embodiment, the HM pinning layer may include either a HM single layer or HM/thin soft FM bilayer. An in-plane isotropic or anisotropic HM layer can be used, but out-of-plane magnetization in the HM layer should be minimized in one embodiment.

In one embodiment, the soft FM pinned layer may include either a soft FM single layer or a SAF-coupled FM/AI/FM layer structure. A radial anisotropy field of the SUL is induced in any direction by exposing the SUL to external radial fields greater than the $H_c$ of the HM pinning layer(s) at room temperature. As long as longitudinal fields do not exceed the $H_c$ of the HM pinning layer, the soft FM pinned layer will return to a remanent state that is antiparallel to the HM pinning layer. This structure allows the pinned layer to easily be arranged into a single domain state with controllable magnetic orientation. By aligning the HM pinning layer in a uniform radial direction, the pinned layer can be pinned as a single domain in the radial direction while maintaining medium permeability, for example, in approximately a range of 30-400 in the circumferential direction of the SUL. In addition, the magnetically set SUL discussed herein may have improved stability to stray fields and improved thermal stability when compared to unpinned SULs and SAF coupled SULs. A significant advantage of such a structure is that conventional sputter equipment can be used for producing the described perpendicular recording media without any special modification.

As discussed above, conventional radial magnet field resets are individually performed on a finished disk but such systems cannot provide sufficient radial magnetic field strengths, for example, in the range of 1-4 kOe that may be required to reset a HM-based SUL. In addition, conventional radial magnet field reset schemes do not provide the ability to batch process multiple disks (e.g., residing in a cassette) due to the lack of a uniform field distribution for multiple disks. Thus, a radial magnetic field reset apparatus providing enhanced magnetic field strength and uniform field distribution is described for radially resetting the pinned direction of SULs on multiple disks within a cassette.

In one embodiment, the radial magnetic field reset apparatus may be used for batch radial field resetting of multiple HM-based SUL disks. Alternatively, the radial magnetic field reset apparatus may be used with other types of SAF, SUL perpendicular recording disks. The radial magnetic field reset apparatus may include a housing having a cavity with a soft magnet rod of disposed at its center and a permanent magnet disposed on the wall of the housing. The size of cavity formed by the permanent magnet and the soft magnet rod is configured such that the rod fits within an inner hole of the cassette (and inner diameter hole of the disks contained therein) and the cassette fits within the permanent magnet when the cassette is inserted into the housing.

The permanent magnet may be composed of, for example, unidirectional aligned permanent magnet pieces, or a radial anisotropic ring-type permanent magnet. The soft magnet rod at the center of the housing cavity attracts the field from the permanent magnet, which results in uniform radial magnetic fields inside the cavity. The length of both the permanent magnet on the inner surface of the housing cavity and the soft magnet rod may be increased to increase the uniform radial magnetic field regions inside the cavity. This extension of uniform field region provides simultaneous field exposure on many disks in a whole cassette. The radial magnetic field strength of the radial field reset apparatus may be determined by various factors such as the volume and magnetic performance of the particular material used for the permanent magnet, a distance between the soft magnet rod and the magnetic permanent magnet on the inner surface of the housing, and/or the efficiency of magnetic flux return. Current magnetic recording disks have various forms depending on dimensions of inner and outer diameters and thickness. It should be noted that the maximum size (i.e., thickness) of the soft magnet rod is only limited by the inner diameter of a disk to be inserted in the radial magnetic field reset apparatus. For a given rod thickness and cavity size of the apparatus, a disk with a large form factor will have smaller radial magnetic field strength than a disk with a smaller form factor because of a longer distance between the soft magnet rod and the permanent magnet and saturation effect of the soft magnet rod in the view of magnetic flux return. However, the thickness of the soft magnet rod and the cavity may be tailored for particular form factor disks. A soft magnetic member may be coupled to the permanent magnet and connected to the soft magnetic rod in order to provide magnetic flux return paths.

Figure 2:
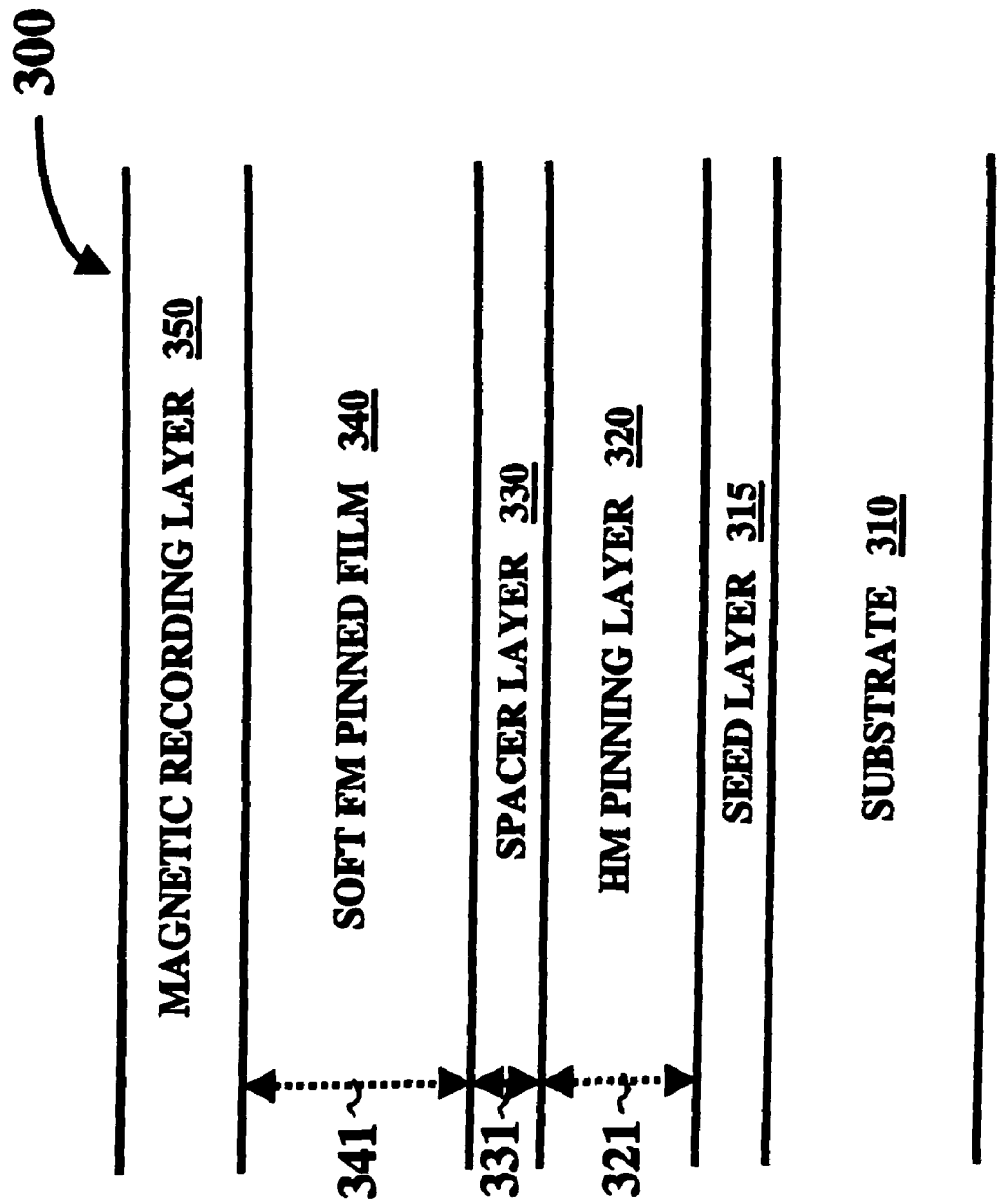
FIG. 2 illustrates one embodiment of a perpendicular magnetic recording disk having a HM pinning layer and a soft FM pinned film.

FIG. 2 illustrates one embodiment of a perpendicular magnetic recording disk. In one embodiment, perpendicular magnetic recording disk 300 includes a substrate 310, a hard magnetic recording layer 350, and an underlayer structure disposed there between. The above-mentioned layers (and the other layers discussed herein) may be formed on both sides of substrate 310 to form a double-sided magnetic recording disk. However, only the layers on a single side of substrate 310 are shown for ease of illustration. Alternatively, a single sided perpendicular magnetic recording disk may be formed.

A substrate 310 may be composed of, for example, a glass material, a metal, and a metal alloy material. Glass substrates that may be used include, for example, a silica containing glass such as borosilicate glass and aluminosilicate glass. Metal and metal alloy substrates that may be used include, for example, Aluminum (Al) and Aluminum Magnesium (AlMg) substrates, respectively. In an alternative embodiment, other substrate materials such as polymers and ceramics may be used. Substrate 310 may also be plated with a nickel phosphorous (NiP) layer (not shown). The substrate surface (or the plated NiP surface) may be polished and/or textured. A seed layer 315 (e.g., Cr) may be disposed above substrate 310. Substrates and seed layers are known in the art; accordingly, a more detailed discussion is not provided.

In one embodiment, a HM pinning layer 320 is deposited above a seed layer 315. The HM pinning layer 320 may be composed of any hard magnetic material or any HM/FM bilayer, in one particular embodiment, having $H_c$ in approximately a range of 100 to 2000 Oe and squareness ratio of magnetization greater than 0.60. The HM pinning layer 320 may have a thickness (t) 321 in approximately a range of 5 to 100 nm. In one embodiment, the HM pinning layer 320 may be composed of a Co based alloy or a Co based alloy/a CoFe alloy. Alternatively, the HM pinning layer 320 may have other coercivity, thickness, and materials. The HM pinning layer 320 is discussed in more detail below.

A spacer layer 330 is disposed above the HM pinning layer 320. The spacer layer 330 may be composed of a material such as Ru. Alternatively, other materials that induce SAF coupling between pinning layer 320 and pinned film 340 may be used for the spacer layer 330, for example, Rhodium (Rh), Iridium (Ir), or Chromium (Cr). The spacer layer 330 may have a thickness 331 in the range of approximately 0.4 to 1.0 nm and, in one particular embodiment, approximately 0.8 nm for Ru. Alternatively, the spacer layer 330 may have a thickness 331 outside of the range given above.

A soft FM pinned film 340 is disposed above the spacer layer 330. The soft FM pinned film 340 may be composed of any soft FM material with a saturation magnetization $4\pi M_s$ higher than, for example, 5 kG, or of any SAF-coupled FM/Al/FM layer structure and have a total FM layer thickness in approximately a range of 40-200 nm.

Figure 3A:
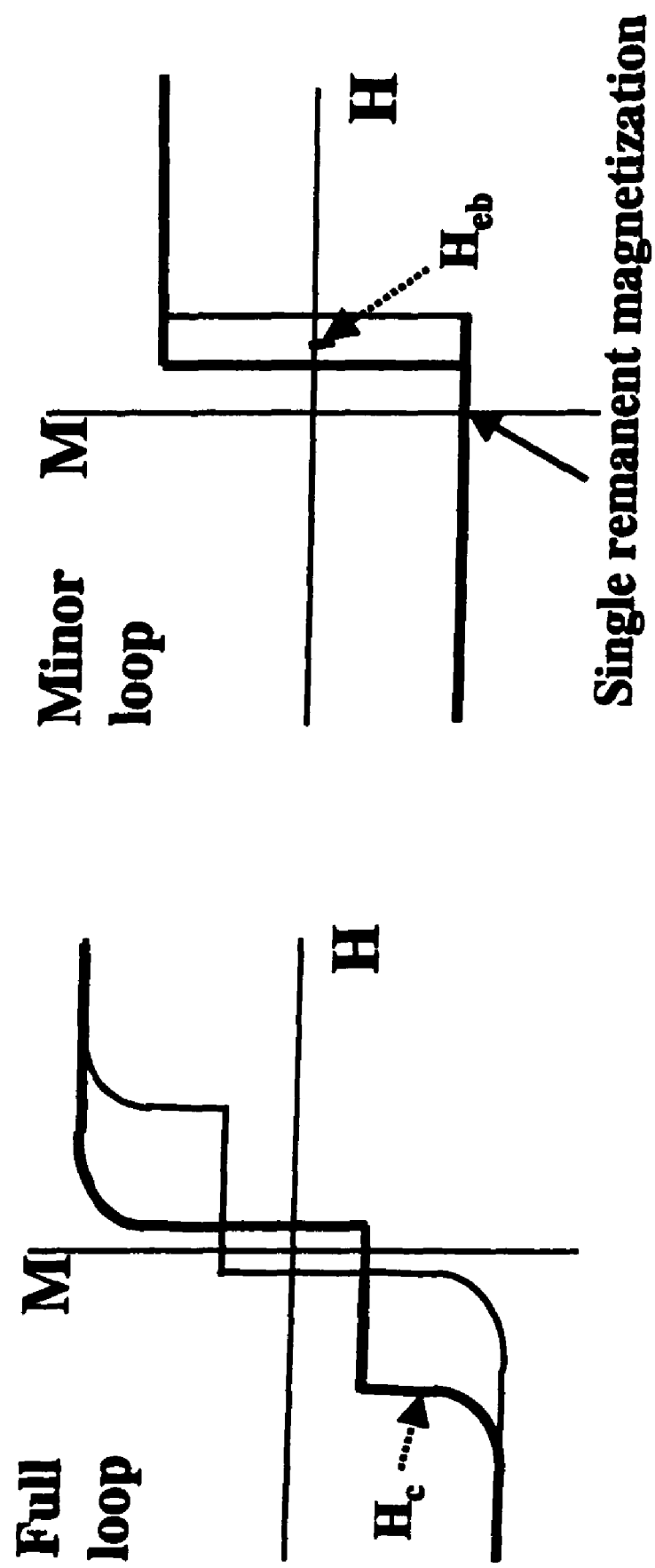
FIG. 3A illustrates the expected full and minor M-H loops of the SUL for a perpendicular magnetic recording disk having a HM pinning layer and a soft FM pinned film.

FIG. 3A illustrates the expected full and minor hysteresis loops of the SUL for a perpendicular magnetic recording disk having the structure of a HM pinning layer (of thickness t and coercivity $H_c$)/a spacer layer/soft FM pinned film (of thickness t and exchange bias field $H_{eb}$), according to one embodiment of the present invention. The magnetization versus applied field (M-H) loops illustrated in FIG. 3A show expected results that may be derived by applying a magnetic field along the radial directions of a disk. $H_c$ of the HM pinning layer 320 measured in units of Oe that determines the SUL's magnetic stability to stray magnetic fields. $H_{eb}$ in the soft FM pinned film 340 greatly determines the permeability of the SUL. As previously discussed, the SUL with a high permeability enhances the head field strength and gradient during the writing process. SAF coupling between the HM pinning layer 320 and the soft FM layer 340 requires that the interfacial exchange energy ($J_{AF}$) between these layers should be more than the Zeeman energy ($M_r H_c t_{FM}$) of soft FM pinned layer with a zero external field. $M_r$ is the remanent magnetization measured in units of magnetic moment per unit volume (e.g., emu/cm³). $t_{FM}$ is the thickness of the soft FM layer. In given materials and $J_{AF}$, lowering $H_c$ can increase $t_{FM}$ if the Zeeman energy is constant. As such, it is contemplated that in order to further improve the structure of the soft FM pinned layer 340 with the HM pinning layer 320, either $J_{AF}$ may be increased and/or $H_c$ of the soft FM pinned layer may be reduced through selection of layer materials and/or insertion of additional layers in the SUL structure, as discussed below.

Figure 3B:
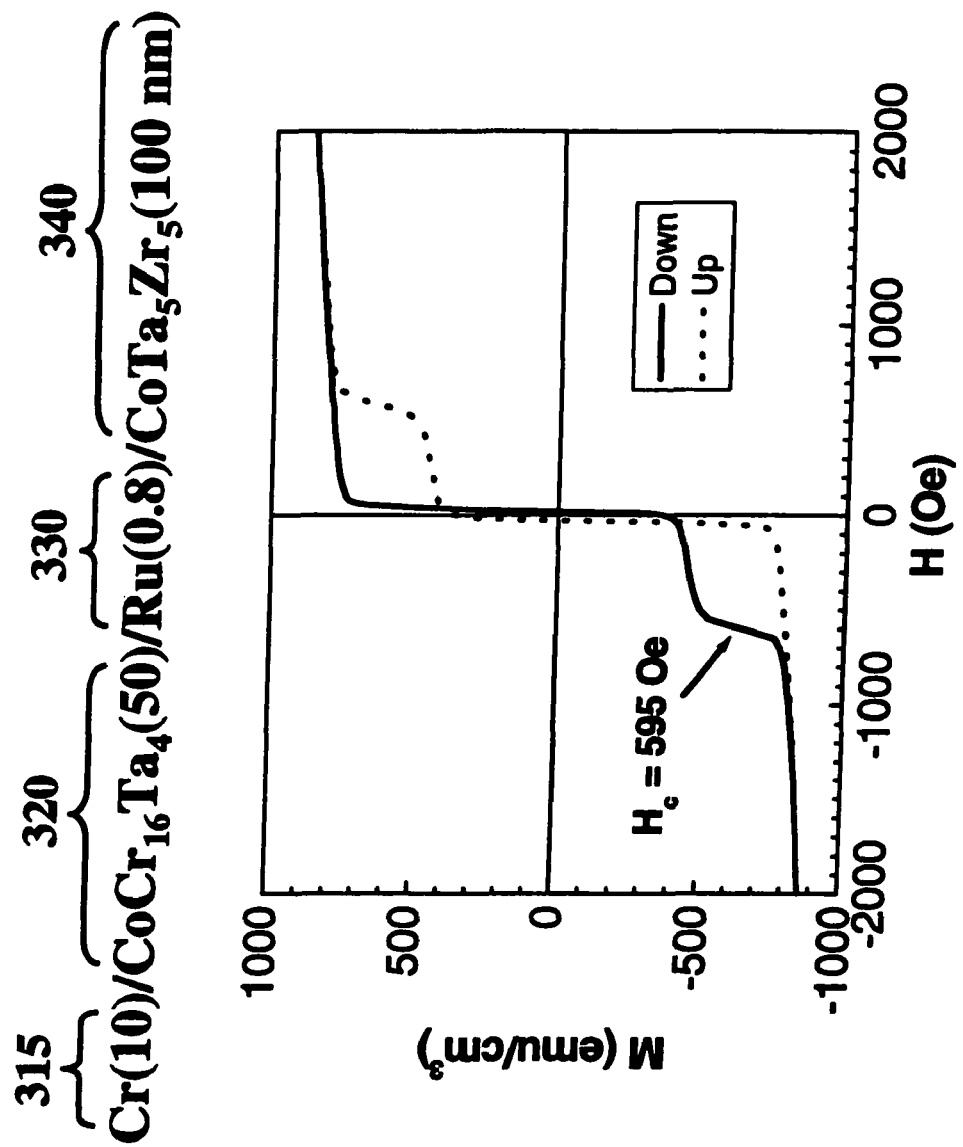
FIG. 3B illustrates the measured M-H loops of the SUL for a perpendicular magnetic recording disk with particular layer materials and thickness, according to one embodiment of the present invention.

FIG. 3B illustrates the measured M-H loops of the SUL for a perpendicular magnetic recording disk with particular layer materials and thickness according to one embodiment of the present invention. A soft FM pinned film 340 with, for example, high $4\pi M_s$ of >5 kG may be selected to avoid saturation effect of the SUL. In one particular embodiment, amorphous $Co_{90}Ta_5Zr_5$ (=CoTaZr) with $H_c<1$ Oe along the easy axis and $4\pi M_s \sim 13$ kG may be used as the material for soft FM pinned film 340, and $CO_{80}Cr_{16}Ta_4$ (=CoCrTa) with isotropic $H_c=515$ Oe and squareness ratio=0.85 may be used as the material for the HM pinning layer 320. The CoTaZr soft FM pinned film 340 may have a thickness 341, for example, of approximately 100 nm, and the HM pinning layer 320 may have a thickness less than the soft FM pinned film 340. Alternatively, soft FM pinned film 340 may have other thickness, for example, greater than approximately 10 nm.

A perpendicular magnetic recording disk having the following layer materials and thickness was produced: Cr(10) seed layer 315/CoCrTa(50) pinning layer 320/Ru(0.8) spacer layer 330/CoTaZr(100) pinned layer 340, with the numbers in parenthesis indicating respective layer thickness in nm. The magnetization curves were obtained by applying a magnetic field along the radial and circumferential directions of the perpendicular magnetic recording disk. The y-axis provides magnetization M in units of emu/cm³ and the x-axis provides applied field H in units of Oe. As shown in FIG. 3B, with the above noted layer structure, a SAF exchange coupling in a 100 nm-thick CoTaZr layer was achieved. The $H_c$ of the CoCrTa HM pinning layer was 595 Oe as noted on FIG. 3B. This enhanced $H_c$ from 515 to 595 Oe is due to SAF exchange coupling and magnetostatic interactions between the CoCrTa layer and the CoTaZr layer.

Figure 3C:
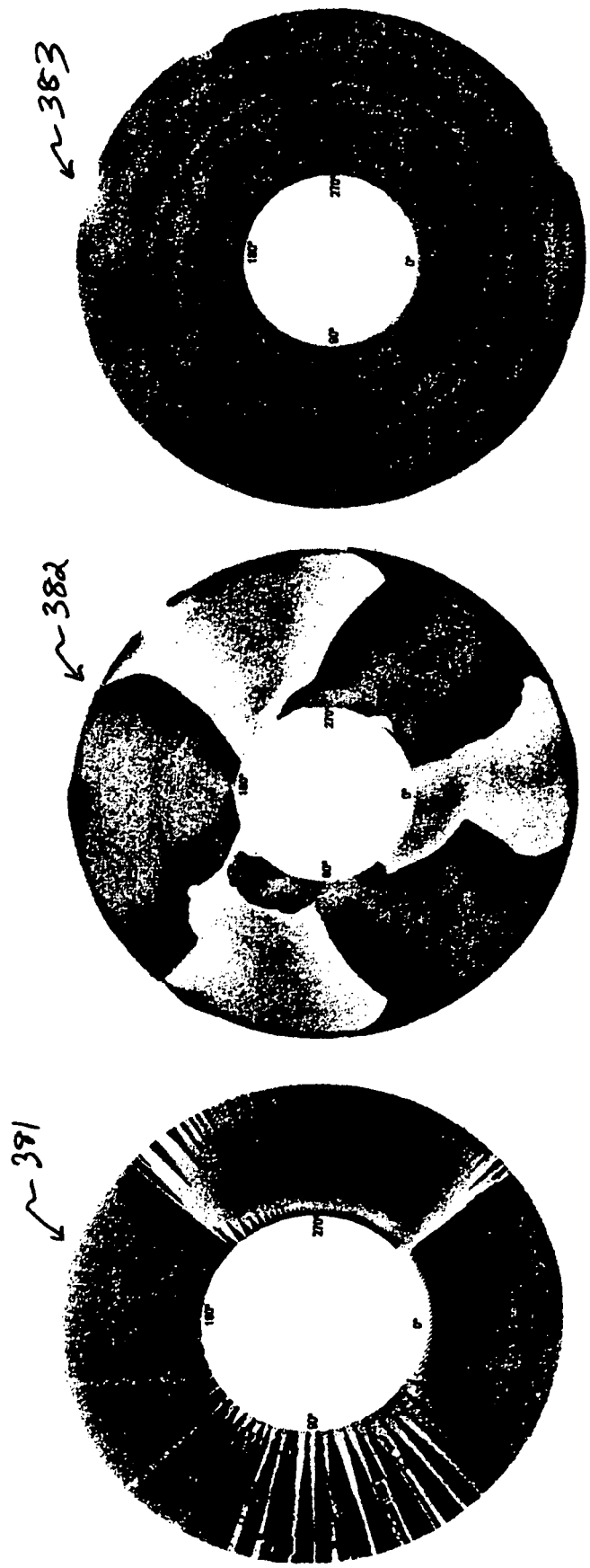
FIG. 3C illustrates optical surface analyzer Kerr images of different types of SUL on perpendicular magnetic recording disks.

FIG. 3C illustrates the magnetic domain structure characterized by Kerr images, created by an Optical Surface Analyzer (OSA), of different types of SULs on perpendicular magnetic recording disks. A disk 381 processed with a conventional 180 nm-thick CoTaZr single layer with a low $H_c$ of <1 Oe shows many 180° domains and reversed edge domains. Asymmetric distribution of magnetic domains may be caused by the existence of in-plane stray fields of 1-2 Oe inside OSA equipment greater than the $H_c$ of CoTaZr, as discussed in Wen Jiang et al., Recording Performance Characteristics of Granular Perpendicular Media, IEEE Transactions on Magnetics, Vol. 41, No. 2, 587, February 2005. A disk 382 processed with a SAF coupled SUL with a structure of CoTaZr(90)/Ru(0.8)/CoTaZr(90 nm) exhibits much less magnetic domains with irregular domain shape compared to disk 381 with a conventional single layer SUL. However, virtually no magnetic domains are observed on a disk 383 with a HM-biased SAF coupled SUL with a structure of Cr(10)/CoCrTa(50)/Ru(0.8)/CoTaZr(100 nm).

Figure 3D:
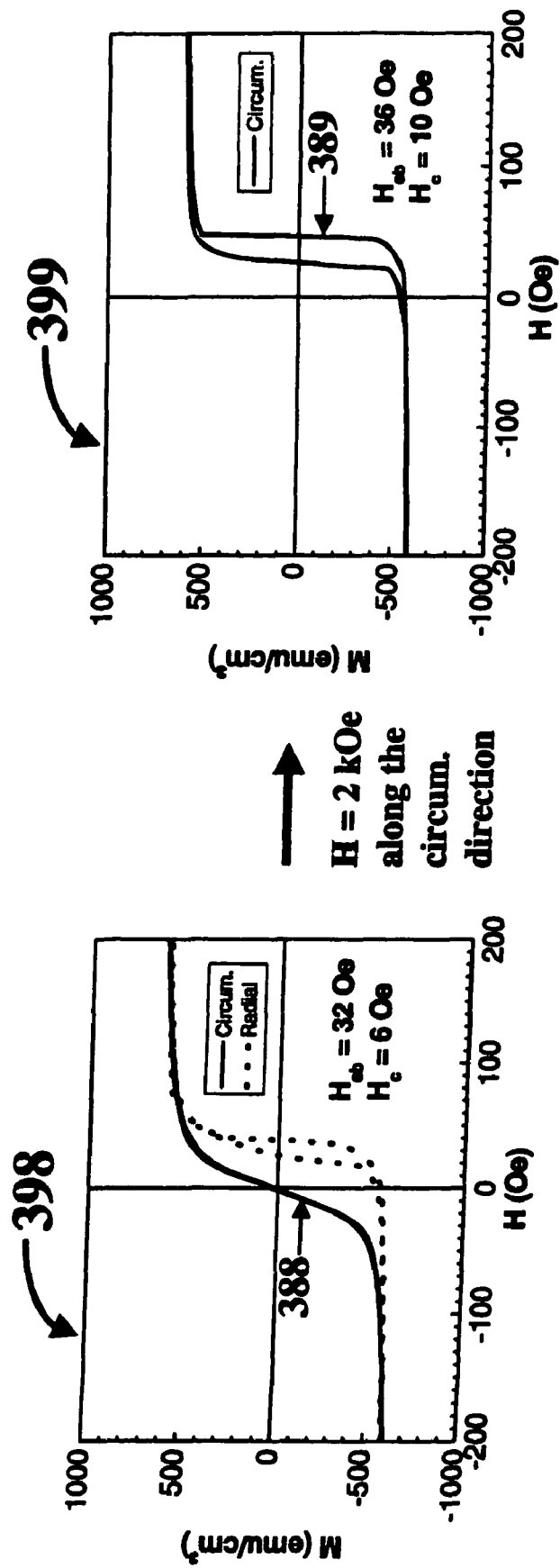
FIG. 3D illustrates minor M-H loops for the pinned direction of the pinned layer switched by an external magnetic field, according to one embodiment of the present invention.

FIG. 3D illustrates minor M-H loops for the soft FM pinned layer of the disk of FIG. 3B and shows the pinned direction being switched by an external magnetic field. The magnetization curves of chart 398 were obtained by applying a magnetic field along the radial and circumferential directions of the perpendicular magnetic recording disk. The y-axis provides magnetization M in units of emu/cm$^3$ and the x-axis provides applied field H in units of Oe. The minor loop with $H_{eb}$=32 Oe and $H_c$=6 Oe is similar to the loops of IrMn/(CoTaZr or CoZrNb) but shows both significantly high value of $J_{AF}$~0.3 erg/cm$^2$ compared to the values of $J_{AF}$=0.08-0.1 erg/cm$^2$ in IrMn/(CoTaZr or CoZrNb) and $J_{AF}$=0.07-0.09 erg/cm$^2$ in CoTaZr/Ru/CoTaZr and better thermal stability based on the Curie temperature of the CoCrTa higher than the Néel temperature of IrMn. An external magnetic field of approximately 2 kOe (being greater than $H_c$=595 Oe of the HM pinning layer 320) was applied along the circumferential direction of the disk. The minor loop 388 along the circumferential direction of the disk was changed from the reversible loop in chart 398 to the hysteretic loop 389 with single remanent magnetization ($H_{eb}$=36 Oe and $H_c$=10 Oe) in chart 399. As shown in chart 399 of FIG. 3D, when a magnetic field that is greater than the $H_c$ of the HM pinning layer 320 is applied in any direction to disk 300, it can induce radial anisotropy along the applied field direction. The induced single remanent magnetization will be maintained under the external stray fields less than $H_c$ of the HM pinning layer 320.

Figure 4A:
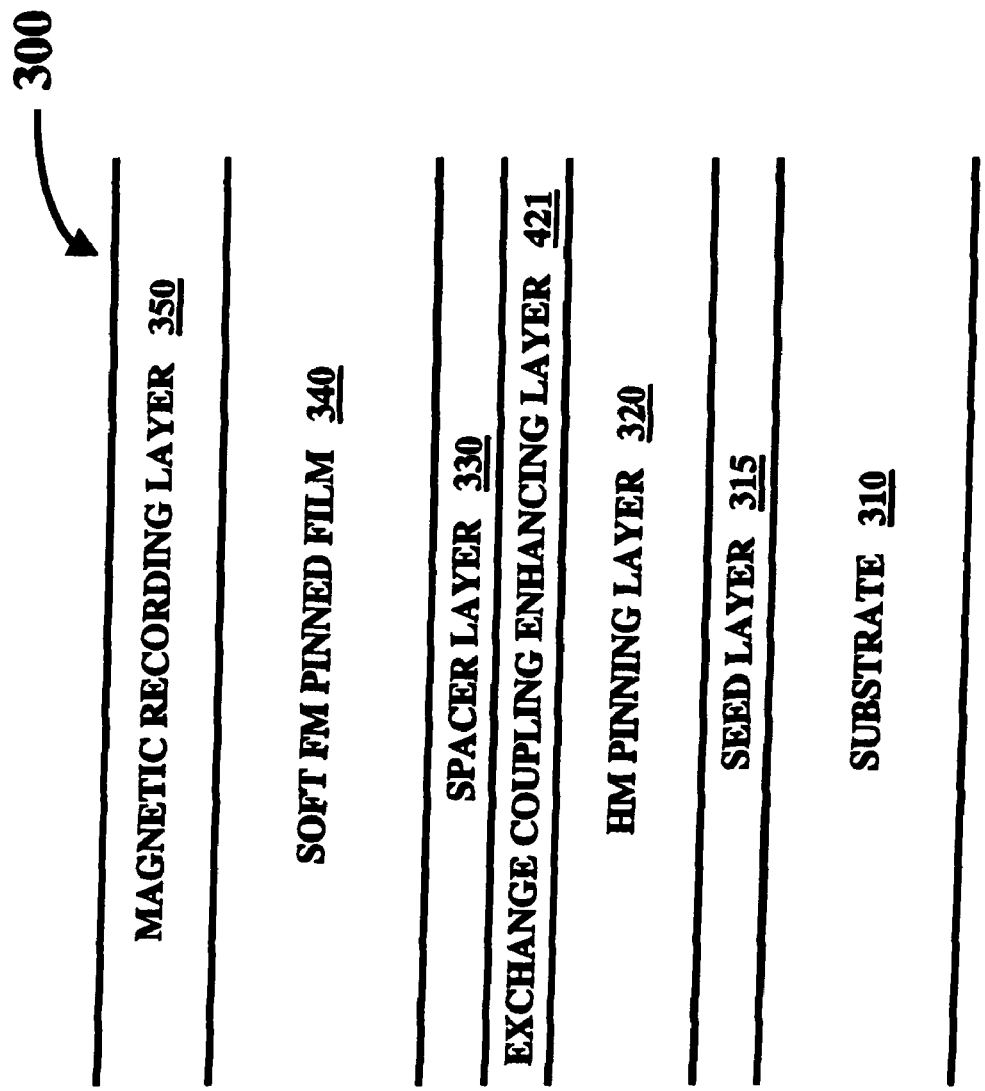
FIG. 4A illustrates one embodiment of a perpendicular magnetic recording disk having an exchange coupling enhancing layer and a HM pinning layer.

FIG. 4A illustrates an alternative embodiment of a perpendicular magnetic recording disk having an exchange coupling enhancing layer and a HM pinning layer. In this embodiment, to improve single domain stability of the SUL, a thin exchange coupling enhancing layer 421 (e.g., composed of CoFe) is inserted between the HM pinning layer 320 (e.g., composed of CoCrTa) and spacer layer 330 in order to increase $J_{AF}$. In one embodiment, the thickness for the soft FM pinning layer 421 may be approximately in the range of 1-5 nm. Alternatively, other Co based alloys such as Co, CoSm, CoPt based alloy, CoNi based alloy, and CoCr based alloy may be used for the exchange coupling enhancing layer 421.

As previously discussed, it is also advantageous to decrease the $H_c$ of the soft FM pinned film 340. The $H_c$ of the soft FM pinned film 340 is decided by contributions of soft FM layer itself and enhancement of $H_c$ by exchange coupling with the HM pinning layer. Poor magnetic orientation and more grain isolations of the HM pinning layer can increase the H$_c$ of the soft FM pinned film. The $H_c$ of the soft FM pinned film 340 may also be lowered by improving the magnetic uniformity of the HM pinning layer 320 through the use of the thin exchange coupling enhancing layer 421 deposited directly above the HM pinning layer 320 and optimization of the Co based alloy through the selection of a proper seed layer and high Co content selected for use as the pinning layers. The $H_c$ of the soft FM pinned film 340 may also be lowered by selection of very soft FM materials (e.g., approximately less than 2 Oe) for the soft FM pinned film 340.

Figure 4B:
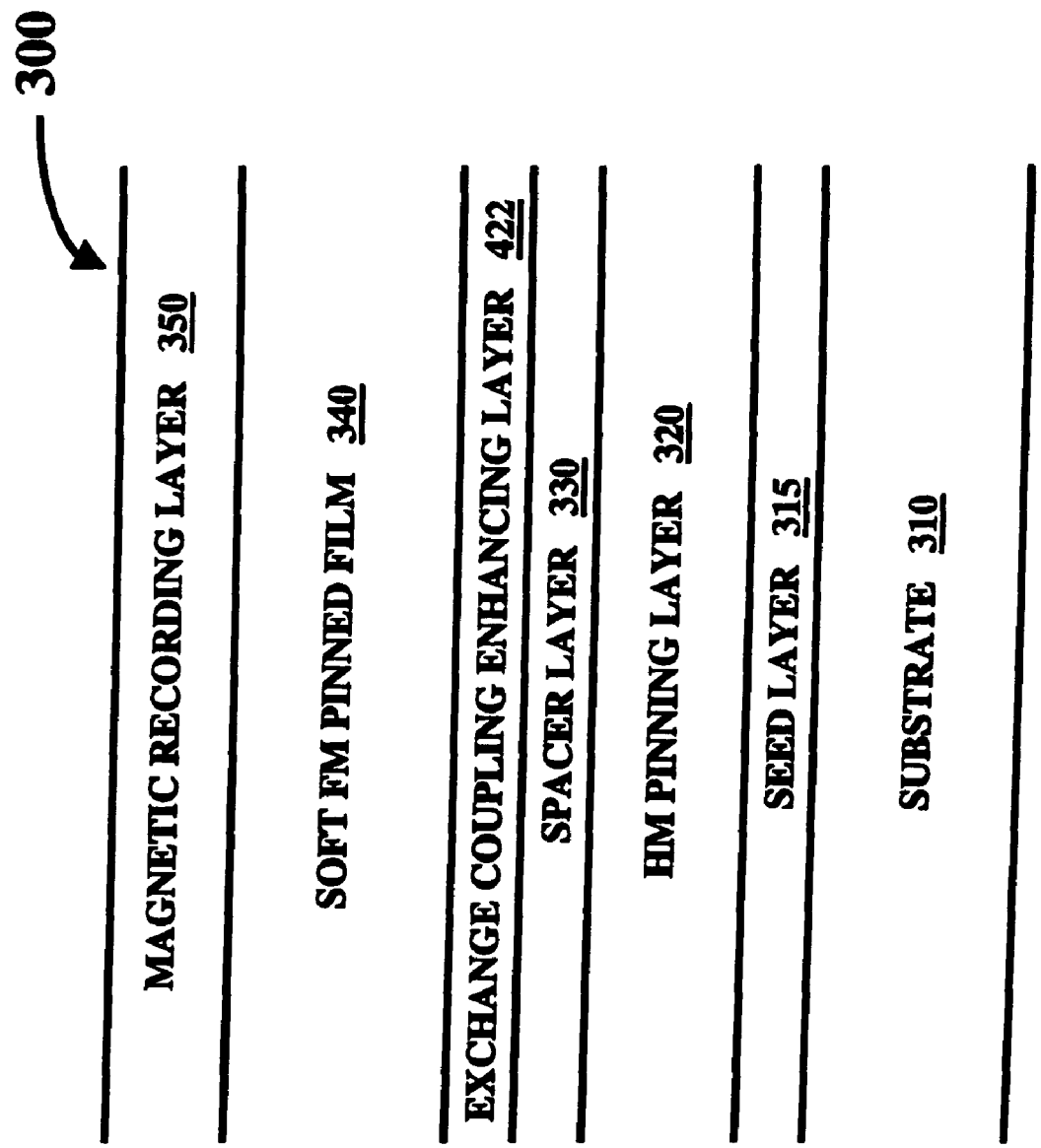
FIG. 4B illustrates an alternative embodiment of a perpendicular magnetic recording disk having an exchange coupling enhancing layer and HM pinning layer.

FIG. 4B illustrates an alternative embodiment of a perpendicular magnetic recording disk having an exchange coupling enhancing layer and a HM pinning layer. In this embodiment, to improve performance of the SUL, an exchange coupling enhancing layer 422 (e.g., composed of CoFe) is inserted between the spacer layer 330 and the soft FM pinned film 340 in order to increase $J_{AF}$. In one embodiment, the exchange coupling enhancing layer 422 may have a thickness, for example, in approximately a range of 1-5 nm. Alternatively, other materials similar to those discussed above with respect to the exchange coupling enhancing layer 421 may be used for the exchange coupling enhancing layer 422. In an alternative embodiment, disk 300 may include both exchange coupling enhancing layer 421 and exchange coupling enhancing layer 422.

Figure 5:
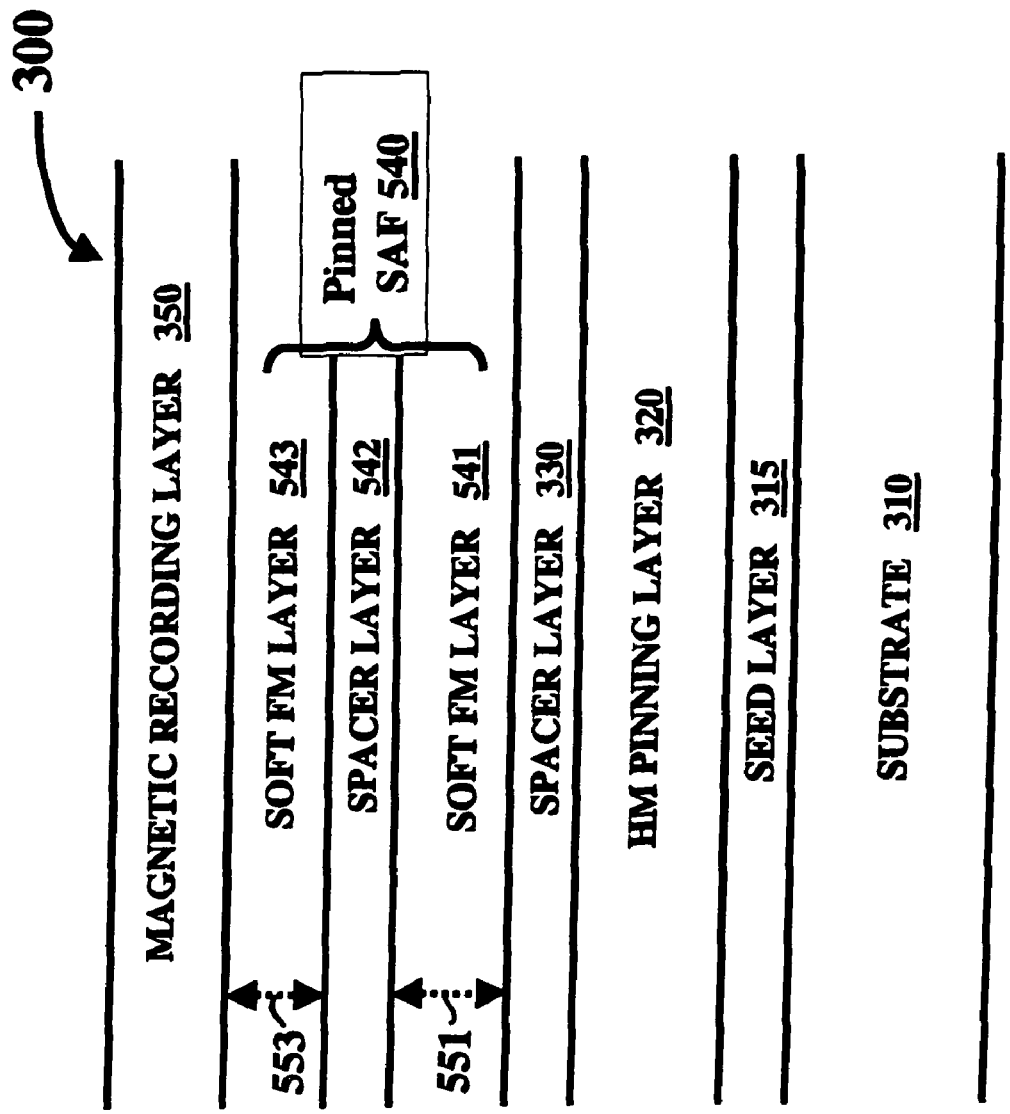
FIG. 5 illustrates one embodiment of a perpendicular magnetic recording disk having a SAF pinned structured.

FIG. 5 illustrates one embodiment of a perpendicular magnetic recording disk having a pinned SAF structure. The structure illustrated in FIG. 5 provides an alternate, or supplemental, means that may be used to increase $J_{AF}$ between soft FM film 340 and HM pinning layer 320 in order to improve the performance of the SUL. In this embodiment, a SAF FM/Al/FM multiple layer structure may be used for the soft FM pinned film 340. In particular, the pinned SAF 540 may include a soft FM layer 541, a spacer layer 542 disposed above the soft FM layer 541, and another soft FM layer 543 disposed above the spacer layer 542.

The SAF structure for layers 541 and 543 may also be selected to increase $H_{eb}$ of the soft FM pinned film 340. A thick soft FM pinned layer has a relatively low $H_{eb}$ resulting in a high permeability. Introduction of SAF structure reduces the thickness of the soft FM pinned layers 541 and 543 to get higher $H_{eb}$ while keeping constant total thickness. In one embodiment, the thickness 553 of the soft FM layer 543 may be selected to be more or less than the thickness 551 of soft FM layer 541. The $H_{eb}$ in the soft FM pinned layers 541 can be enhanced due to contribution of both top and bottom SAF coupling. Thus, values of permeability in the soft FM pinned layer 541 and 543 can be adjusted by considering SUL performance such as write-ability and adjacent track erasure. Alternatively, other thickness relationships (e.g., approximately equal) may be used for the soft FM layers 541 and 543.

Figure 6:
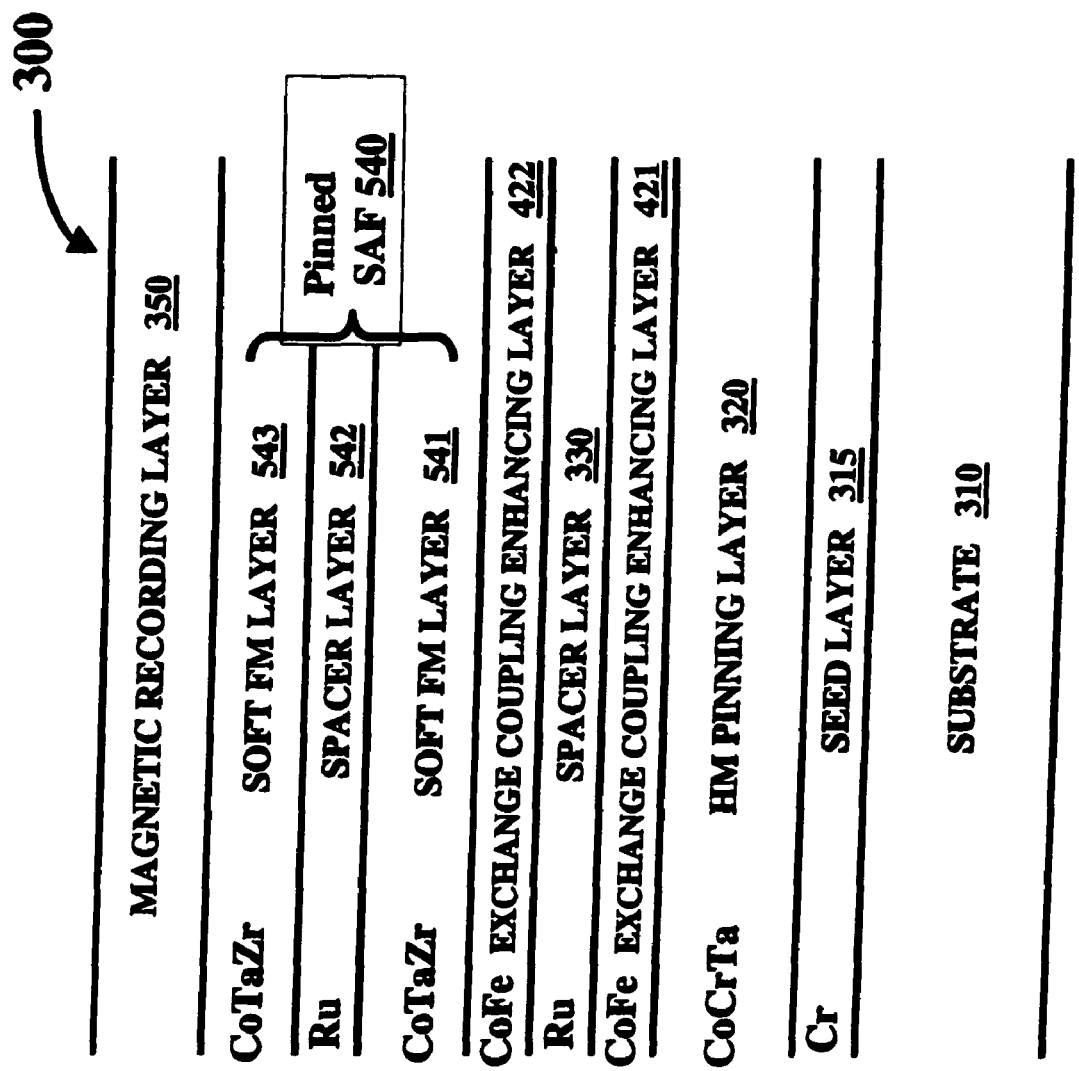
FIG. 6 illustrates an exemplary embodiment a perpendicular magnetic recording disk having a SAF pinned structured, exchange coupling enhancing layers, and a HM pinning layer.

FIG. 6 illustrates an embodiment of a perpendicular magnetic recording disk having a SAF pinned structured and a HM pinning layer with exemplary materials that may be used for each layer. In this embodiment, disk 300 includes a Cr seed layer 315 disposed above substrate 310. A CoCrTa HM pinning layer 320 is disposed above the seed layer 315. A CoFe exchange coupling enhancing layer 421 is disposed above the HM pinning layer 320. A Ru spacer layer 330 is disposed above CoFe exchange coupling enhancing layer 421. A CoFe exchange coupling enhancing layer 422 is disposed above the spacer layer 330. A CoTaZr soft FM layer 541 is disposed above the exchange coupling enhancing layer 422. A Ru spacer layer 542 is disposed above the CoTaZr soft FM layer 541. A CoTaZr soft FM layer 543 is disposed above the spacer layer 542. A magnetic recording layer 350 is disposed above the soft FM layer 543.

In regards to FIGS. 2-6, it should be noted that one or more additional layers may also be disposed between soft FM pinned film 340 and magnetic recording layer 350, for example, a nucleation layer (not shown). Nucleation layer may be used to facilitate a certain crystallographic growth within the magnetic recording layer 350. A structured nucleation layer in addition to the underlayer(s) may provide for a finer crystalline structure and a c-axis preferred orientation of the magnetic recording layer 350. The structured nucleation layer may include multiple intermediate layers providing, for example, for epitaxial growth of subsequently deposited magnetic recording layer 350. A nucleation layer, whether implemented as a nucleating underlayer or an intermediate layer, controls the morphology and grain orientation of subsequent layers. Specifically, a nucleation layer controls grain size, grain spacing, grain orientation and c-axis of the grains of subsequently deposited layers and the magnetic recording layer 350. The nucleation layer material may be selected based on its crystal structure and relatively close lattice match for certain lattice planes to the selected magnetic layer material. To function best as a perpendicular recording layer, the material of the magnetic recording layer 350 (e.g., Cobalt alloy or Cobalt alloy oxide) should have the c-axis of the granular structures disposed perpendicular to the substrate plane. As such, nucleation layer may be used to facilitate a crystal direction in magnetic recording layer 350 that is perpendicular to the film plane. Nucleation layers are known in the art; accordingly, a detailed discussion is not provided. Additional layers, for other examples, may also include other intermediate layer(s) between magnetic recording layer 350 and the soft FM pinned film 340.

Disk 300 may also include one or more layers (not shown) on top of the magnetic recording layer 350. For example, a protection layer may be deposited on top of the magnetic recording layer 350 to provide sufficient properties to meet tribological requirements such as contact-start-stop (CSS) and corrosion protection. Predominant materials for the protection layer are carbon-based materials, such as hydrogenated or nitrogenated carbon. A lubricant may be placed (e.g., by dip coating, spin coating, etc.) on top of the protection layer to further improve tribological performance, for example, a perfluoropolyether or phosphazene lubricant. Protection and lubrication layers are known in the art; accordingly, a detailed discussion is not provided.

Figure 7:
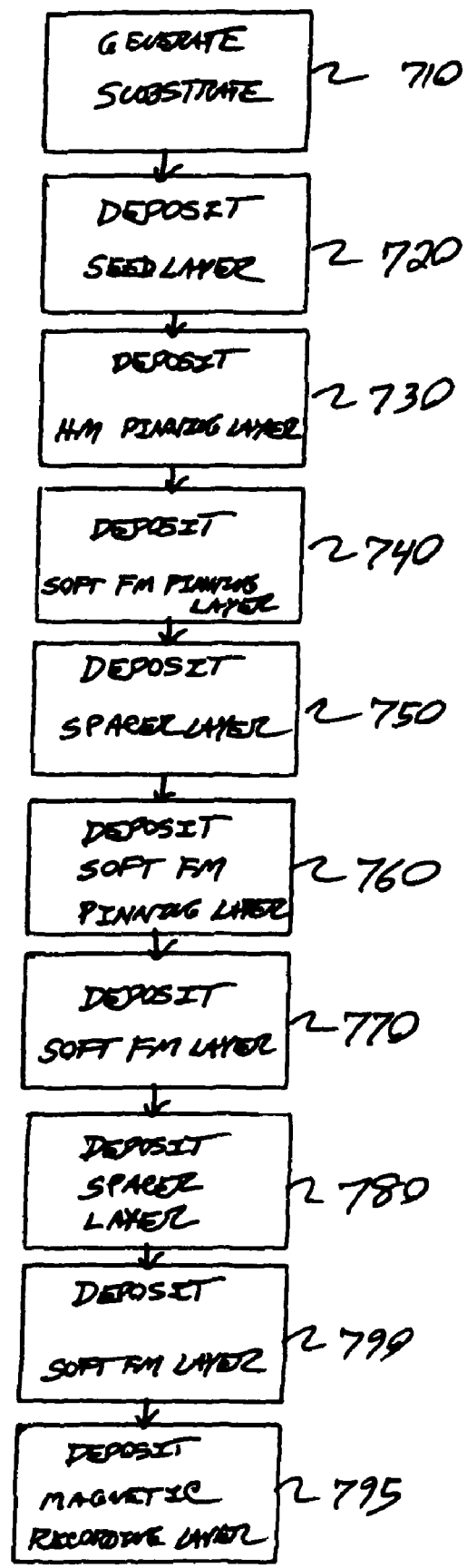
FIG. 7 illustrates one embodiment of a method of manufacturing perpendicular magnetic recording disk.

FIG. 7 illustrates one embodiment of a method of manufacturing perpendicular magnetic recording disk 300. A substrate 310 is generated, or otherwise provided, in step 710. The generation of a substrate for a magnetic recording disk is known in the art; accordingly, a detailed discussion is not provided. In one embodiment, the substrate 310 may be plated (e.g., with NiP) and may also be polished and/or textured prior to subsequent deposition of layers.

In step 720, the seed layer 315 is deposited above substrate 310. In step 730, the HM pinning layer 320 is deposited above the seed layer 315. In step 740, the exchange coupling enhancing layer 421 is deposited above the HM pinning layer 320. In step 750, a spacer layer 330 is deposited above the exchange coupling enhancing layer 421. In step 760, the exchange coupling enhancing layer 422 is deposited above the spacer layer 330. In step 770, the soft FM layer 541 is deposited above the exchange coupling enhancing layer 422. In step 780, the spacer layer 542 is deposited above the soft FM layer 541. In step 790, the soft FM layer 543 is deposited above the spacer layer 542. In step 795, the magnetic recording layer 350 is deposited above the soft FM layer 543. Additional layers may be deposited below and above the magnetic recording layer 350 as discussed above. It should be noted that one or more of the above steps may be omitted as desired.

The deposition of each of the seed layer, HM pinning layer, spacer layer(s), the soft FM layer(s), the nucleation layer, the magnetic recording layer, and the protection layer can be accomplished by a variety of methods well known in the art, for example, sputtering (e.g., static or in-line), chemical vapor deposition (CVD), ion-beam deposition (IBD), etc. Static sputter systems are available from manufacturers such as Intevac Inc. of Santa Clara, Calif., and Balzers Process Systems, Inc. of Alzenau, Germany. With in-line sputtering systems, disk substrates are loaded on a pallet that pass through a series of deposition chambers the deposit films successively on substrates. In-line sputtering systems are available from manufacturers such as Ulvac Corp. of Japan.

Figure 8:
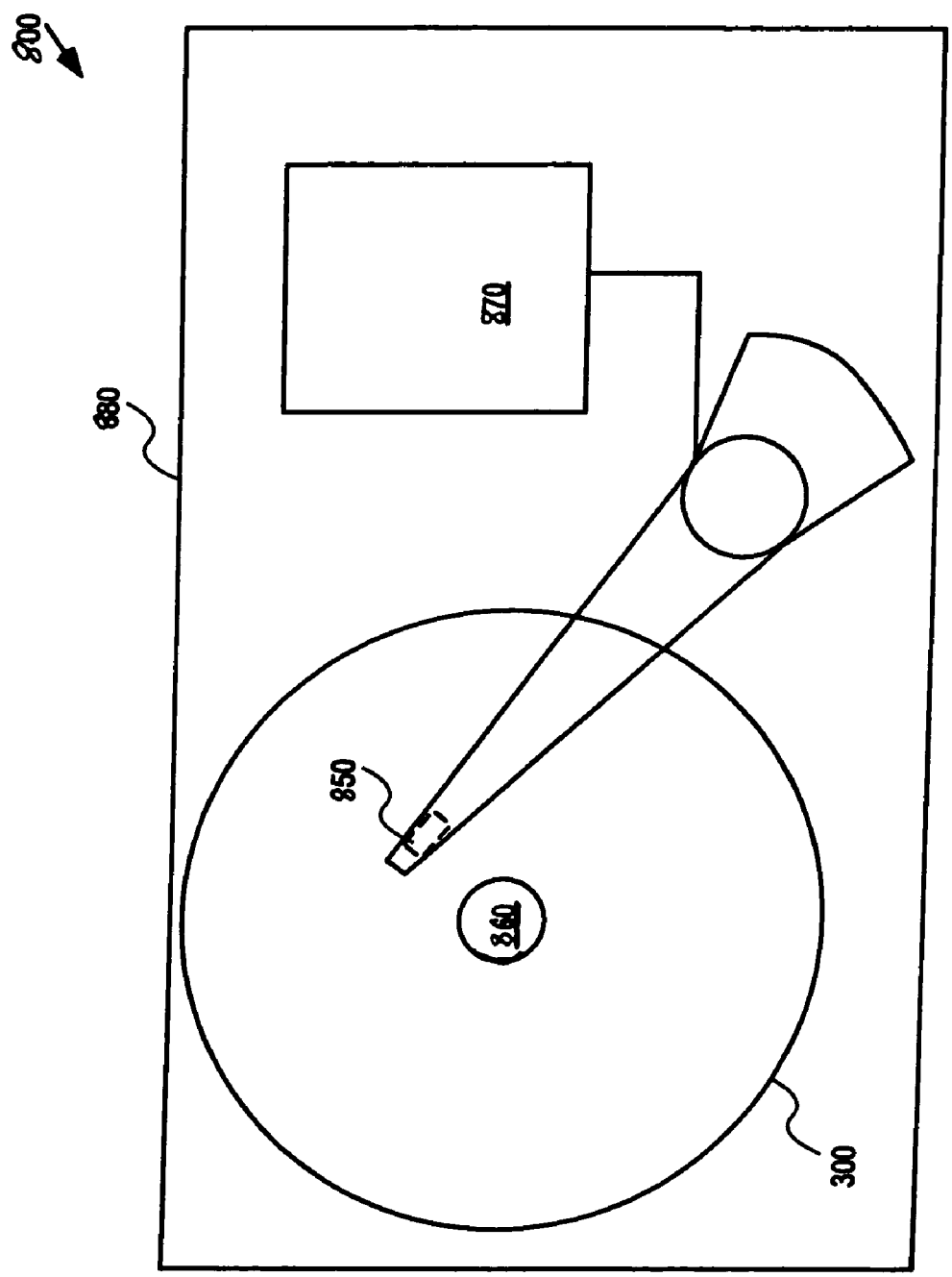
FIG. 8 illustrates a disk drive having an embodiment of the perpendicular magnetic recording disk.

FIG. 8 illustrates a disk drive having disk 300. Disk drive 800 may include one or more disks 300 to store datum. Disk 300 resides on a spindle assembly 860 that is mounted to drive housing 880. Data may be stored along tracks in the magnetic recording layer 350 of disk 300. The reading and writing of data is accomplished with head 850 that has both read and write elements. The write element is used to alter the properties of the perpendicular magnetic recording layer 350 of disk 300. In one embodiment, head 850 may have a magnetoresistive (MR) and, in particular, a giant magneto-resistive (GMR) read element and an inductive write element. In an alternative embodiment, head 850 may be another type of head, for example, an inductive read/write head or a Hall effect head. A spindle motor (not shown) rotates a spindle assembly 860 and, thereby, disk 300 to position head 850 at a particular location along a desired disk track. The position of head 850 relative to disk 300 may be controlled by position control circuitry 870. The use of disk 300 fabricated in the manners discussed herein may render the perpendicular magnetic recording layer 350 of disk 300 less prone to noise from the soft magnetic underlayer(s).

As discussed above in relation to FIG. 3B, with the above described exemplary layer structure for the perpendicular magnetic recording disk, the $H_c$ of the CoCrTa HM pinning layer is 595 Oe. Accordingly, a radial magnetic field (being greater than $H_c$=595 Oe of the HM pinning layer 320) is required for radially resetting the pinned direction of the SUL. In one embodiment, a radial magnetic field strength approximately equal to or greater than 1.5 times the $H_c$ of the HM pinning layer is used, for example, a radial magnetic field of approximately 900 Oe when $H_c$=595 Oe. Such an externally applied radial magnetic field can align the HM pinning layer 320 in a substantially radial direction and, thereby, provide a bias field to the soft FM film 340 to induce a substantially single domain state in the SUL. The induced single domain state in the SUL will be maintained under the external stray fields less than $H_c$ of the HM pinning layer. Alternatively, other radial magnetic field strengths in excess of the $H_c$ of the HM pinning layer 320 may be used.

Figure 9A:
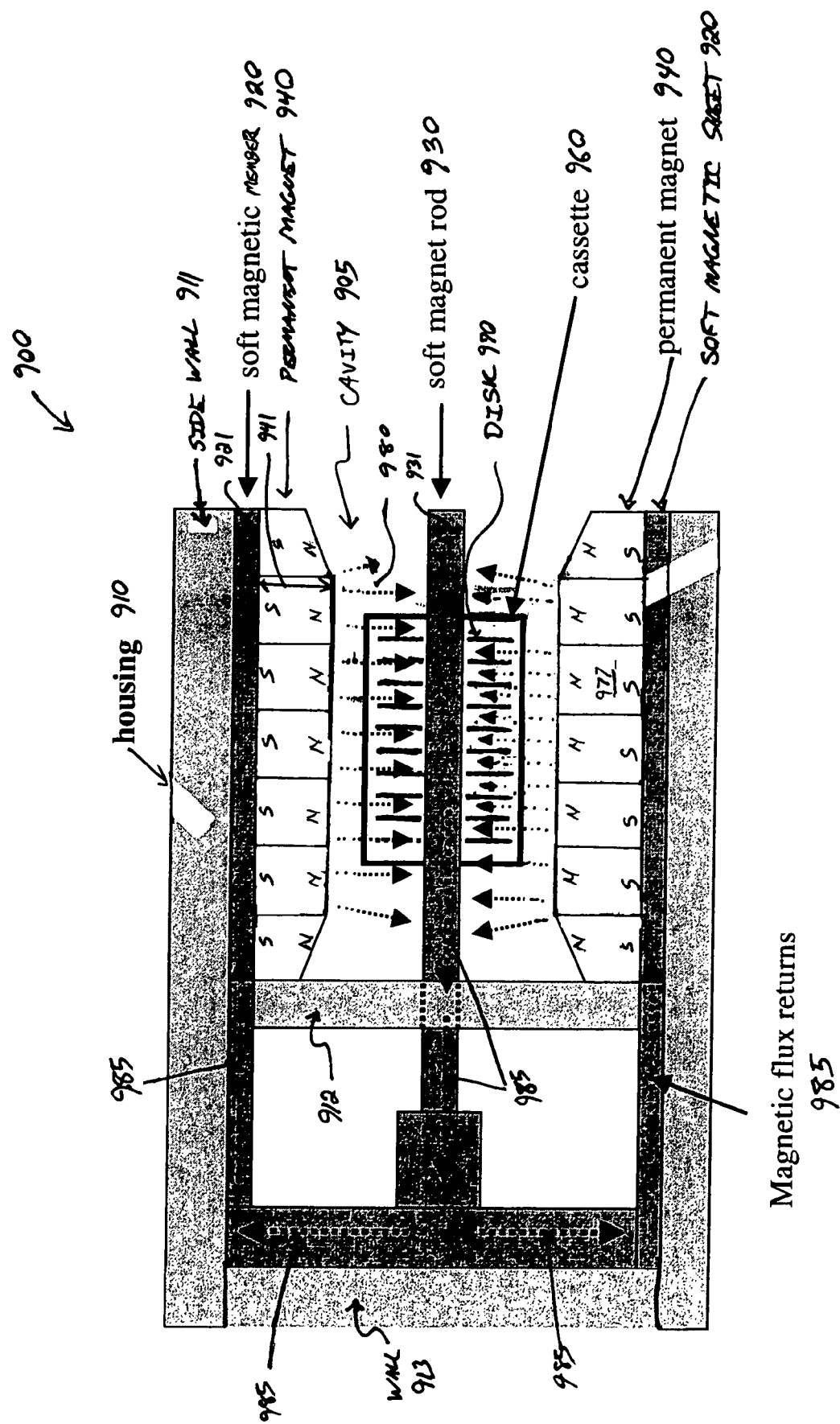
FIG. 9A is a cross sectional view illustrating one embodiment of a radial magnetic field reset apparatus.

FIG. 9A is a cross sectional view illustrating one embodiment of a radial magnetic field reset apparatus. In this embodiment, the radial magnetic field reset apparatus 900 is configured to receive a cassette containing one or more disks. The radial magnetic field reset apparatus 900 may be used for batch processing of multiple disks by concurrently inducing a single domain state in the SUL of each the disks contained within the cassette using a substantially radial magnetic field generated therein.

Radial magnetic field reset apparatus 900 includes a housing 910, having a cavity 905 disposed therein. Although illustrated with an open cavity, in an alternative embodiment, a lid (e.g., hinged or detached) may be secured to apparatus 900 to close the cavity. The lid may be composed of a magnetic material to provide a return flux path from the soft magnet rod 930 to the soft magnetic member 920. Apparatus 900 also includes a soft magnet rod 930 disposed at approximately the center of the cavity 905 and a permanent magnet 940 disposed on the inner surface of the housing side wall 911 that, in one embodiment, forms cavity 905. The size of cavity 905 and the soft magnet rod 930 is configured such that soft magnet rod 930 fits within an inner hole of a cassette 960, and inner diameter hole of one or more disks (e.g., disk 970) contained therein, when the cassette 960 is inserted into the cavity 905 of housing 910. In one embodiment, cassette 960 may be configured to contain 25 disks. Alternatively, cassette 960 may be configured to contain more or less than 25 disks.

In this embodiment, housing 910 is a cylindrical housing having a cylindrical side wall 911 and a back wall 912 that may be used to provide structural support for the magnets. In alternative embodiments, housing 910 may have other shapes (e.g., hexagonal, rectangular, etc.). In this embodiment, the back wall 912 and the permanent magnet 940, that is coupled to soft magnetic member 920, form cavity 905. Alternatively, wall 912 may be omitted such that wall 913 along with side wall 911 forms cavity 905. Yet in other embodiments, other mechanical configurations that provide structural support to the radial magnetic field reset apparatus 900 may be used.

A soft magnetic member 920 may be coupled to the inside surface of the side wall 911 along its entire perimeter or portions thereof. In one embodiment, soft magnetic member 921 may have a thickness 921 of approximately 30 mm. Alternatively, soft magnetic member 921 may have other thickness. Permanent magnet 940 may be coupled to the soft magnetic member 920 along its entire perimeter or portions thereof. A soft magnet rod 930 is coupled in the housing 910 at approximately the center of cavity 905. The maximum thickness (e.g., diameter) 931 of the soft magnet rod 930 is only limited by the inner diameter of the disks (e.g., disk 970) that will be inserted into radial magnetic field reset apparatus 900. In one embodiment, the thickness 931 (illustrated in FIG. 9B) of the soft magnet rod 930 is selected such that there is a small gap (e.g., 10 mm) between the soft magnet rod 930 and the inner diameter of the disks in order to mitigate potential damage and/or contamination to the disks due to contact between soft magnet rod 930 and the inner diameter of the disks. Alternatively, gaps of other sizes, including a gap of 0 mm, may be used.

Figure 9B:
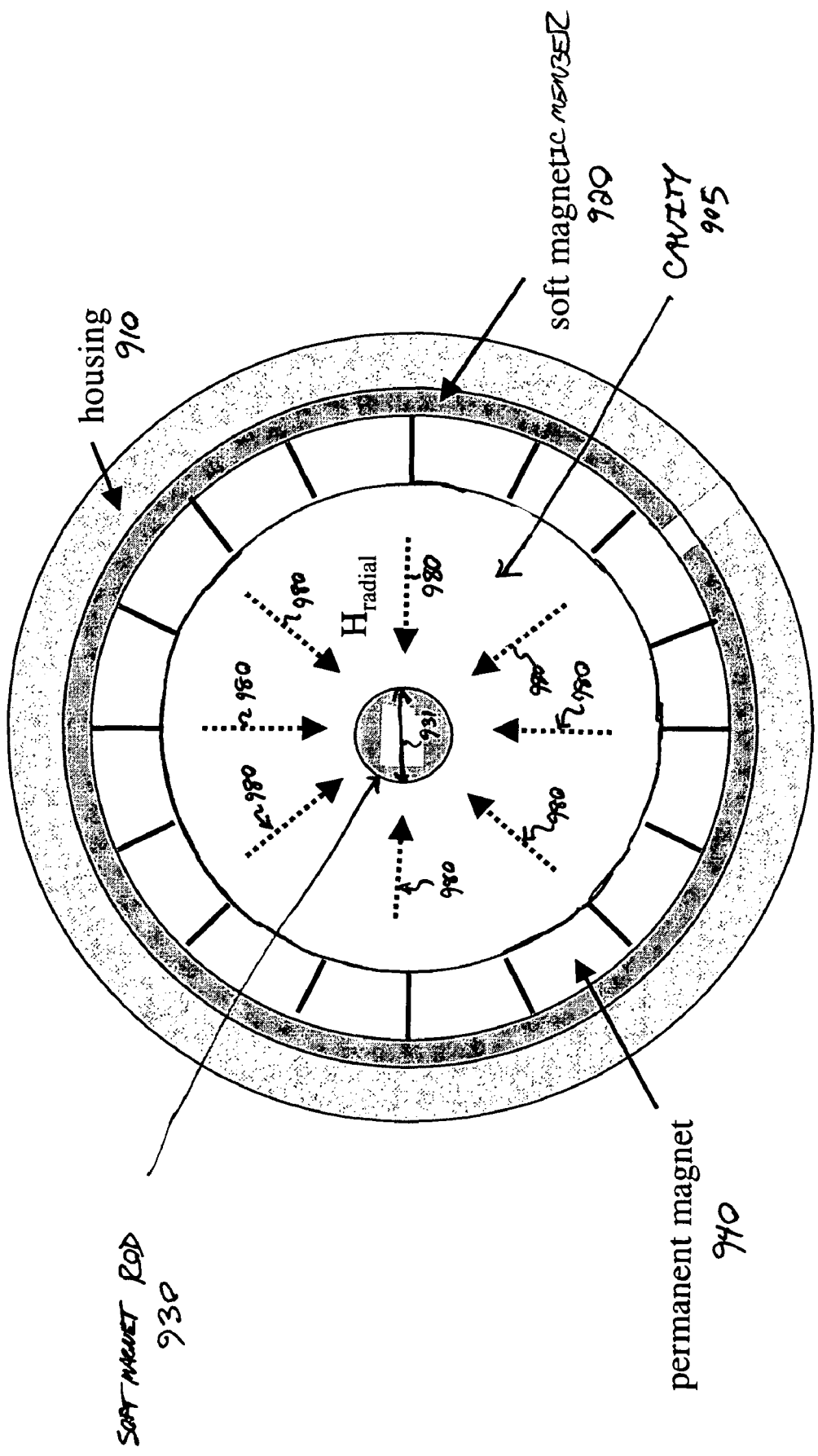
FIG. 9B is a side view illustrating the radial magnetic field reset apparatus of FIG. 9A.

FIG. 9B is a side view illustrating the radial magnetic field reset apparatus of FIG. 9A. The soft magnet rod 930 at the center of housing 910 attracts the field from the permanent magnet 940, which results in substantially uniform radial magnetic field $H_{radial}$ as illustrated by the dashed field lines 980 inside the cavity 905. In one embodiment, soft magnet rod 930 has a substantially circular cross section, as illustrated in FIG. 9B. Alternatively, soft magnet rod 930 may have other cross-sections, for example, oval, hexagonal, square, etc.). Soft magnet rod 930 may be solid or, alternatively, may be hollow. In one embodiment, soft magnet rod 930 may be composed of pure iron. Alternatively, other magnetic materials may be used for soft magnet rod 930, for example, low carbon steel (steel 1008) and super alloy Vanadium Permendur (hiperco 50).

In alternative embodiments, for example, that utilize non-ring shaped permanent magnets and/or soft magnet rods of non-circular cross-sections, a non-uniform radial field distribution may occur. In such embodiments, another soft magnetic member 949 may be coupled to the permanent magnet 940 in order to aid in establishing a more uniform radial magnetic field distribution in cavity 905 and in relieving saturation effect of the soft magnet rod 930, as illustrated in FIG. 9C. Soft magnetic member 949 may be thinner than soft magnetic member 920 thought not necessarily so. In one embodiment, for example, soft magnetic member 949 may have a thickness 948 being approximately in a range of 2 to 8 mm and a length along the Z direction 901 being approximately in a range of 120 mm to a length of the permanent magnet 940. Alternatively, soft magnetic member 949 may have other thickness. Soft magnetic members 920 and 949 may be composed of any soft magnetic material, for example, NiFe, Fe, CoFe and CoFeV.

Permanent magnet 940 may be composed of unidirectional aligned permanent magnet pieces (e.g., radially aligned magnet piece 977). It should be noted that the polarity (i.e., N-S) of permanent magnet 940 shown in FIG. 9A may be reversed. In an alternative embodiment, permanent magnet 940 may have other configurations, for example, permanent magnet 940 may be a radial anisotropic ring-type permanent magnet. Anisotropic ring-type permanent magnets are known in the art and are available from manufacturers such as Hitachi Metals America, Ltd. Permanent magnet 940 may be tapered at one or both of its ends (e.g., tapered or cut end 947) in order to reduce opposite magnetic field strength in such regions as discussed below in further detail. In one embodiment, permanent magnet 940 may be composed of NdFeB and may have a thickness 941 being approximately in a range of 10-90 mm. In one particular embodiment, permanent magnet 940 may have a thickness 941 being approximately equal to or greater than 60 mm. The use of a thick permanent magnet 940 may operate to increase the radial magnetic field strength of apparatus 900.

In one particular embodiment, permanent magnet 940 may be NdFeB Grade 30 having a remanent flux density (Br) of 11.4 kG and a maximum value of energy product $(BH_{max})$ of 30 MGOe. Alternatively, other permanent magnets (e.g., Alnico magnets, made by alloying Aluminum, Nickel and Cobalt with Iron, and Samarium Cobalt magnets) and thickness may be used. The soft magnetic member 920 is coupled between the permanent magnet 940 and the soft magnet rod 930 at the center of cavity 905 in order to provide magnetic flux return paths 985. In one embodiment, the soft magnetic member 920 may be disposed along the side wall 911 and back wall 913 of the housing 910. Alternatively, soft magnetic member 920, or portions thereof, may be disposed in other positions in or on housing 910.

Figure 9D:
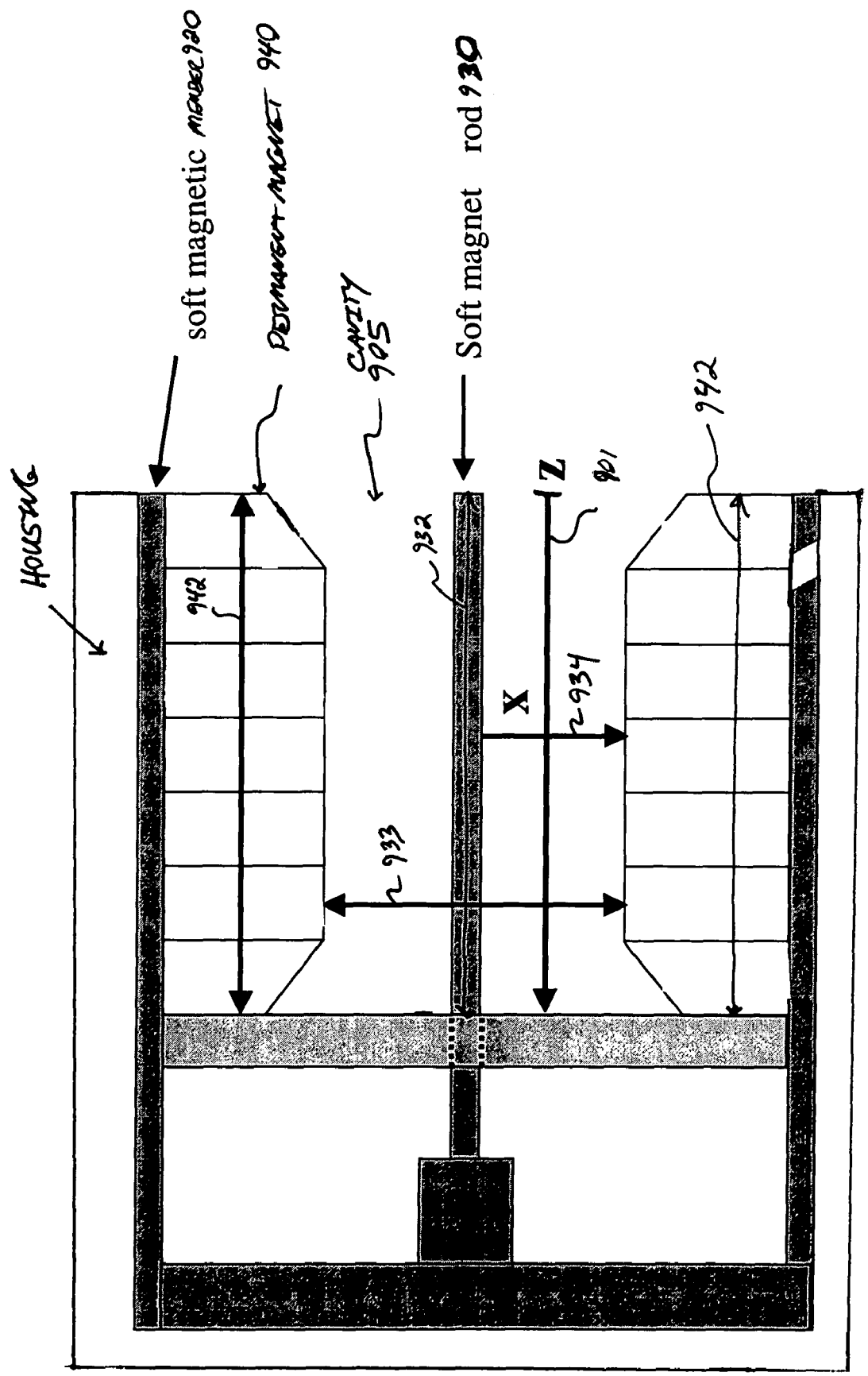
FIG. 9D is a cross sectional view illustrating exemplary dimensions of an embodiment of a radial magnetic field reset apparatus.

Referring now to FIG. 9D, the length 942 of permanent magnet 940 and the length 932 of soft magnet rod 930 may be selected based on the thickness of a disk and the number of disks intended to be inserted into the radial magnetic field reset apparatus 900. For example, disk 970 may have a thickness approximately in a range of 0.39 mm to 1.75 mm. In one embodiment, the minimum lengths 942 and 940 may be selected to be approximately equal to or greater than the combined thickness of disks (which may determine the length of the cassette 960) intended to be inserted into the radial magnetic field reset apparatus 900. The length 942 of permanent magnet 940 and the length 932 of soft magnet rod 930 may be increased from this minimum length to increase the length of the substantially uniform radial magnetic field regions inside the cavity 905. This extension of the length of the substantially uniform field $H_{radial}$ 980 region provides concurrent field exposure on many disks in a whole cassette. The radial magnetic field $H_{radial}$ 980 strength of the radial magnetic field reset apparatus 900 may be determined by various factors such as the volume and magnetic performance of the particular material used for the permanent magnet 940, a distance 934 between the soft magnet rod 930 and the permanent magnet 940, and the efficiency of magnetic flux returns 985. In one embodiment, where, for example, the cassette 960 length is approximately 200 mm, the length 942 of the permanent magnet 940 may be approximately in a range of 300 to 400 mm. The use of a permanent magnet having a length that is substantially longer than the cassette length may provide more of a uniform field zone length as discussed in further detail below.

Current magnetic hard disks have various form factors depending on dimensions of inner and outer diameters and thickness. For a given thickness 931 of the soft magnet rod 930 and cavity 905 size of the apparatus, radial magnetic field strength is getting higher close to the soft magnet rod 930 because of more concentrated flux per unit area. Thus, a disk with a smaller form factor will have larger radial magnetic field strength than a disk with a larger form factor. In one embodiment, for example, where apparatus 900 is used with disks having a 95 mm outer diameter and 25 mm inner diameter in a cassette 960 having a 200 mm length and containing 25 disks, distance 933 is selected to be 180 mm, distance 934 is selected to be 90 mm and distance 932 is selected to be 300 mm. However, the thickness 931 of the soft magnet rod 930 and the cavity dimension 933 may be tailored for particular form factor disks as discussed below.

Figure 10:
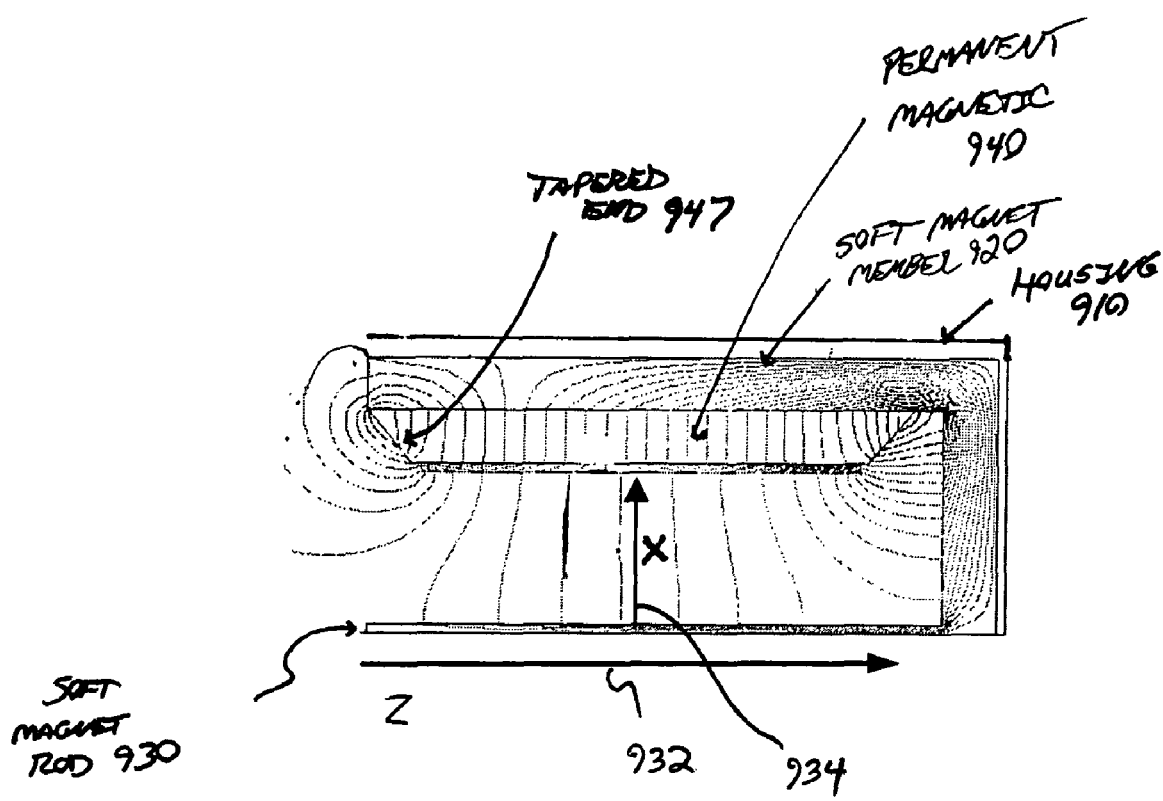
FIG. 10 illustrates the magnetic field distribution for one embodiment of a radial magnetic field reset apparatus.

FIG. 10 illustrates the magnetic field distribution for one embodiment of a radial magnetic field reset apparatus. As previously mentioned, permanent magnet 940 may be tapered at one or both of its ends (e.g., tapered end 947) in order to reduce the magnetic field strength in this area as shown by the curved field lines in FIG. 10 as compared with the more radially oriented field lines along the middle of the length 932 of the permanent magnet 940. Such tapering provides a means to reduce the effect of the magnetic field on the disks when removed from the radial magnetic field reset apparatus 900.

The thickness 931 of the soft magnet rod 930 and the cavity dimension X 933 may be determined based on the generated radial magnetic field strengths. In particular, the radial magnetic field strengths were calculated for different diameter rods (10 mm and 20 mm) as a function of the distance Z 901 using different X distances, with X=0 being at the center of the soft magnet rod 930 and Z=0 being at the outside end of the soft magnet rod 930. In this embodiment, a 30 mm thick permanent magnet was used and a disk having a 25 mm inner diameter and 95 mm outer diameter was used.

Figure 11:
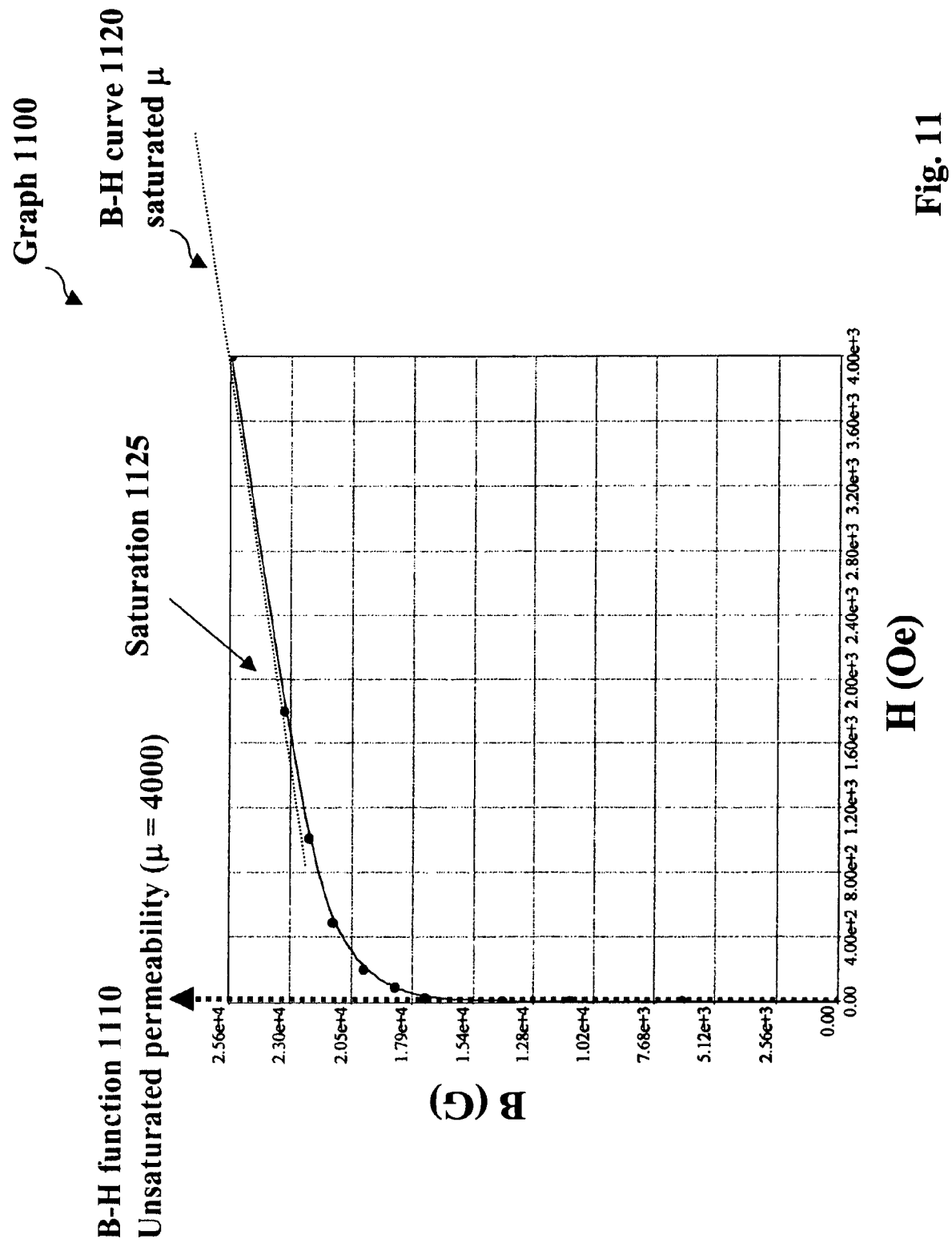
FIG. 11 is a B-H graph illustrating a comparison of unsaturated and saturated permeability rods of pure iron.

In order to check the effect of saturation of the soft magnet rod 930 on radial magnetic strength and its distribution, unsaturated and saturated permeability ($\mu$) rods are compared. The rod with an unsaturated permeability will show no saturation of the soft magnet rod 930, which will provide perfect magnetic flux return paths. FIG. 11 is a B-H graph illustrating a comparison of unsaturated and saturated permeability ($\mu$) rods of pure iron, where the flux density (B) is equal to the applied field (H)+$4\pi M$ and $\mu=B/H=1+4\pi M/H$. Graph 1100 shows the B-H function 1110 for a soft magnet rod 930 of pure iron having an unsaturated permeability of 4000. Graph 1100 also includes the B-H curve 1120 for a saturated permeability ($\mu_{initial}$=4000) soft magnet rod 930 of pure iron, that shows substantial saturation 1125 at approximately H=2000 Oe. In practical use of radial magnetic field reset apparatus 900, soft magnet rod 930 may saturate at its center.

Figure 12B:
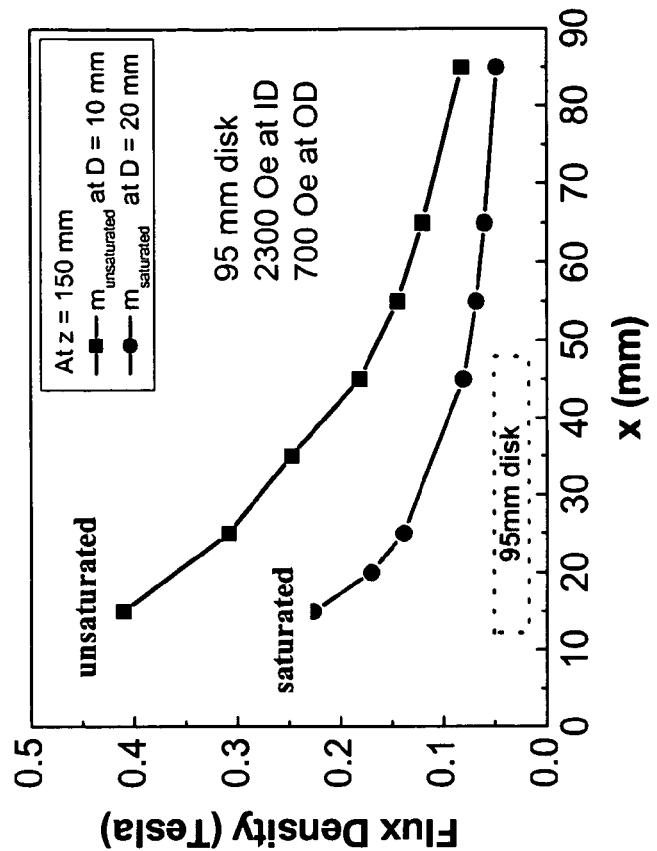
FIGS. 12A and 12B illustrate the effect of unsaturated and saturated permeability of one embodiment of a soft magnet rod on the radial magnetic field strength.
Figure 12A:
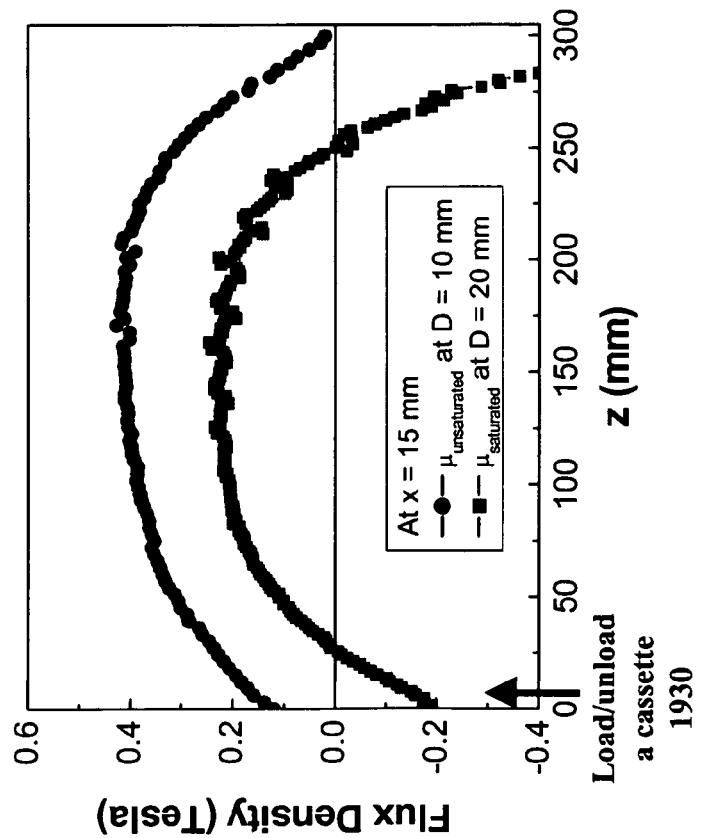

The flux density data of FIGS. 12A and 12B are for a radial magnetic field reset apparatus 900 having a cavity radius of 90 mm, a permanent magnet 940 with a 30 mm thickness 941 and a 300 mm length 942, and a 95 mm diameter (i.e., a radius of 47.5 mm along the X direction 934) disk. FIG. 12A shows the flux density (Tesla) versus distance 932 for an unsaturated permeability soft magnet rod 930 being 10 mm in thickness 931 and a saturated permeability soft magnet rod 930 being 20 mm in diameter 931. Where 1 Tesla (T)=1 Weber/$m^2$=796 emu/$cm^3$=10 kG=10 kOe. As can be seen from FIG. 12A, there is a significant decrease in the radial magnetic field strength with the use of a saturated permeability rod with an opposite field direction existing at the ends of the radial reset field apparatus 900 (as indicated by the negative flux density in FIG. 12A). The opposite field direction near the opening of the cavity at the Z=0 position may effect disks (e.g., disk 970) during loading/unloading 1930 of the cassette 960. FIG. 12B exhibits the radial magnetic field strengths for different X distances 934 in the range of 15-85 mm at a Z=150 mm distance 901 of the soft magnet rod and permanent magnet. Due to the saturation effect, the radial field strength is significantly reduced to 2300 Oe at ID and 700 Oe at OD of a 95 mm disk.

For the disks described above in regards to FIG. 3B having $H_c$ of the CoCrTa HM pinning layer being 595 Oe, and assuming a required radial magnetic field strength approximately equal to or greater than 1.5 times the $H_c$ of the HM pinning layer (e.g., 900 Oe), it can be seen from the plots in FIGS. 12A and 12B that a soft magnet rod diameter of 20 mm can be used with X distances 934 up to 90 mm. Accordingly, with a rod thickness 931 greater than or equal to 20 mm, the distance X 934 between the center of soft magnet rod 930 and the surface of permanent magnet 940 (or, alternatively, soft magnetic member 949 if used) may be selected to be less than approximately ⅓ of the length 932 of the soft magnet rod 930 and/or permanent magnet 940. For example, where Z is selected to be approximately 300 mm, X may be selected to be less than 100 mm (e.g., 90 mm). An apparatus 900 with such a configuration may be used with disks having an inner diameter greater than 10 mm (e.g., 20 mm and 25 mm) and an outer diameter less than 100 mm (e.g., 48 mm, 65 mm, 70 mm, 84 mm and 95 mm).

Figure 13C:
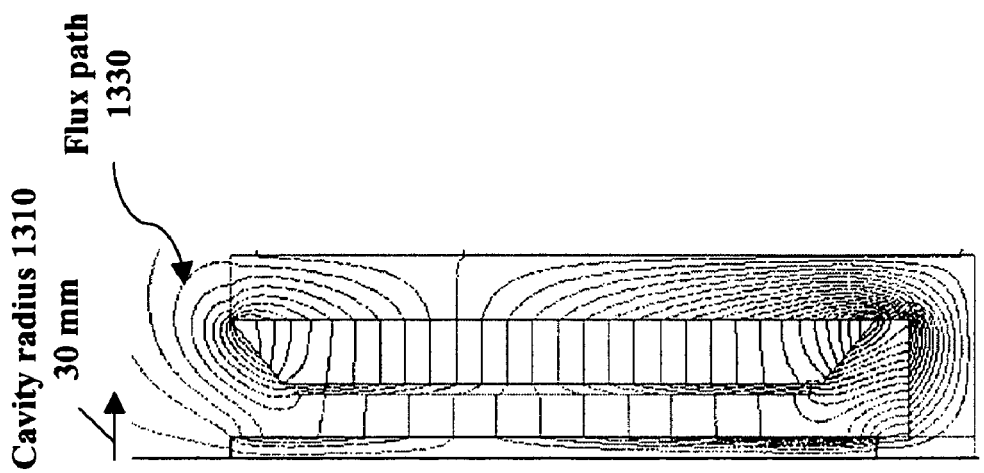
FIGS. 13A-13C illustrate the effect of one embodiment of cavity radius on the magnetic field distribution.
Figure 13B:
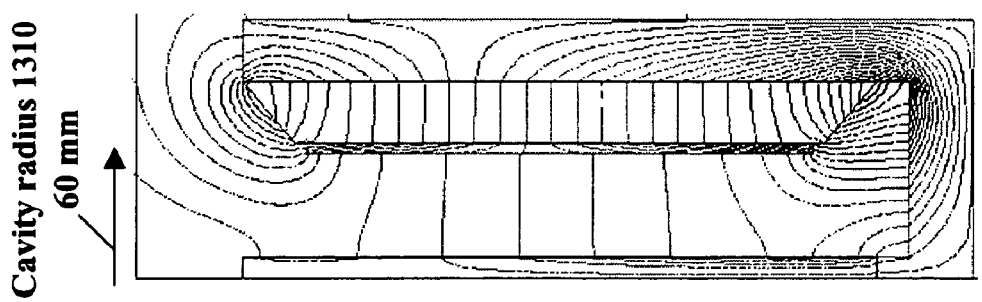
Figure 13A:
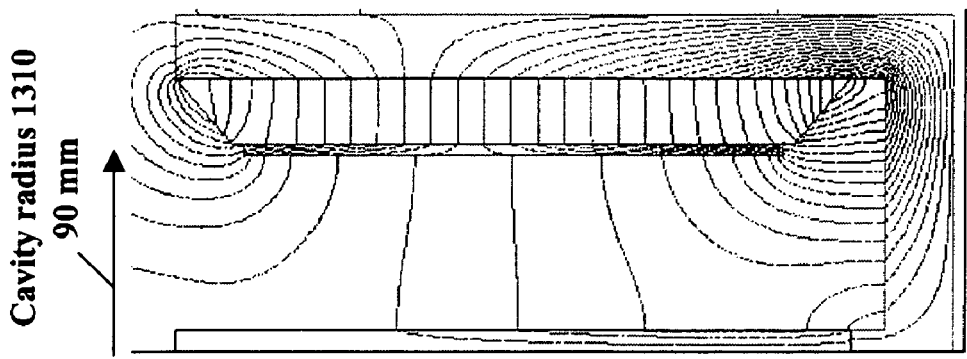

FIGS. 13A-13C illustrate the effect of one embodiment of cavity radius on magnetic field distribution. All of the illustrated radial magnetic field distributions are for a radial magnetic field reset apparatus 900 having a soft magnet rod 930 with a 20 mm thickness 931, a permanent magnet 940 with a 30 mm thickness, and a soft magnetic member 949 with a 5 mm thickness. The illustrated radial magnetic field distributions of FIGS. 13A, 13B and 13C are for a radial magnetic field reset apparatus 900 having a cavity radius 1310 of 90 mm, 60 mm and 30 mm, respectively. As can be seen from the radial magnetic field distributions of FIGS. 13A-13C, as the cavity size decreases to 30 mm, a second flux return path 1330 having opposite direction field lines (as indicated by the negative flux density values of the plots).

Figure 14B:
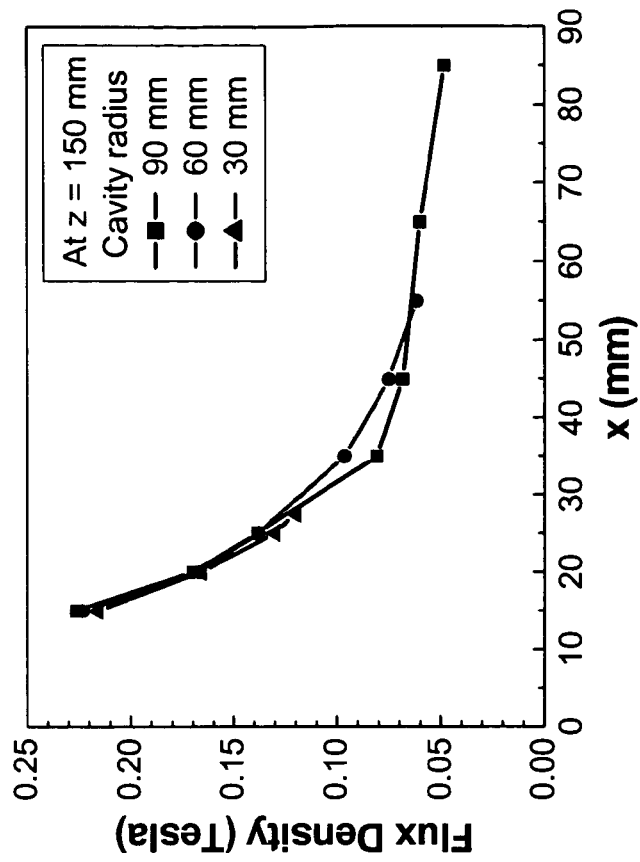
FIGS. 14A and 14B illustrate the effect of one embodiment of the cavity radius on the radial magnetic field strength.
Figure 14A:
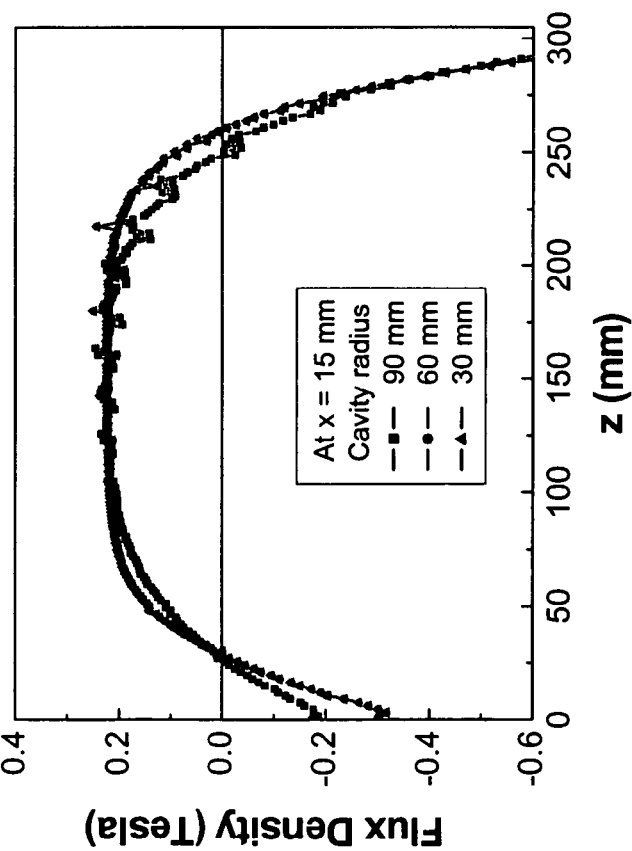

FIGS. 14A and 14B illustrate the effect of one embodiment of cavity radius on the radial magnetic field strength. The flux densities are for a radial magnetic field reset apparatus 900 having a soft magnet rod 930 with a 20 mm diameter, a permanent magnet 940 with a 30 mm thickness, and a soft magnetic member 949 with a 5 mm thickness. FIG. 14A shows that there may be some improvement of the uniform field area with a decrease in the cavity size. As can be seen from FIG. 14B, as the cavity size (e.g., its radius) decreases, there may be no enhancement of the radial magnetic field strength.

Figure 15C:
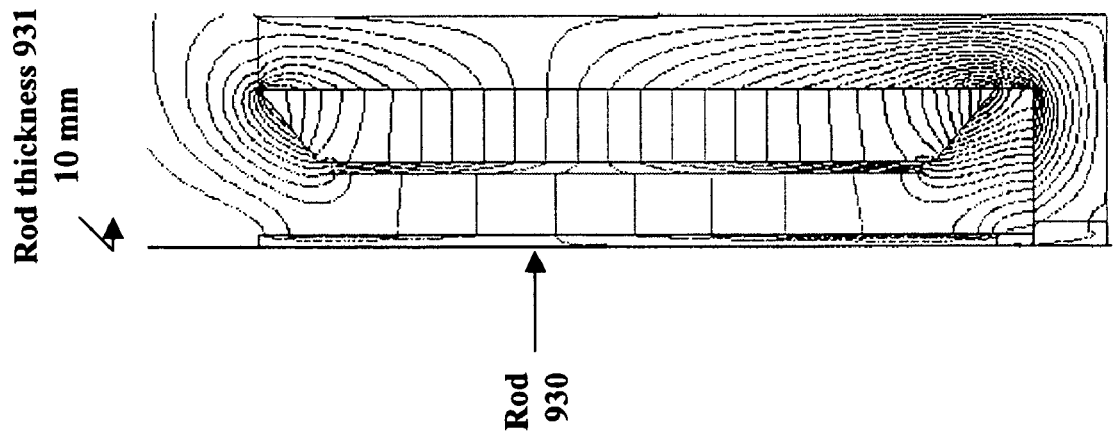
FIGS. 15A-15C illustrate the effect of one embodiment of a soft magnet rod thickness on magnetic field distribution.
Figure 15B:
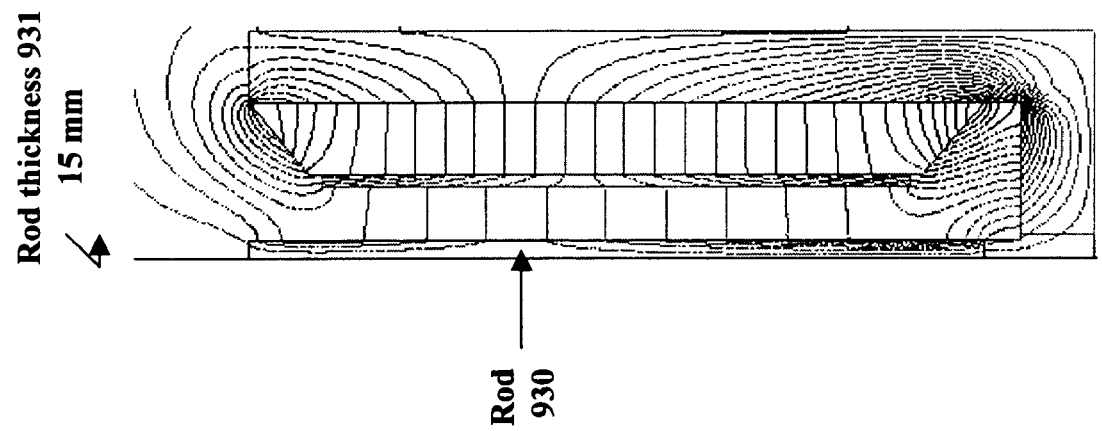
Figure 15A:
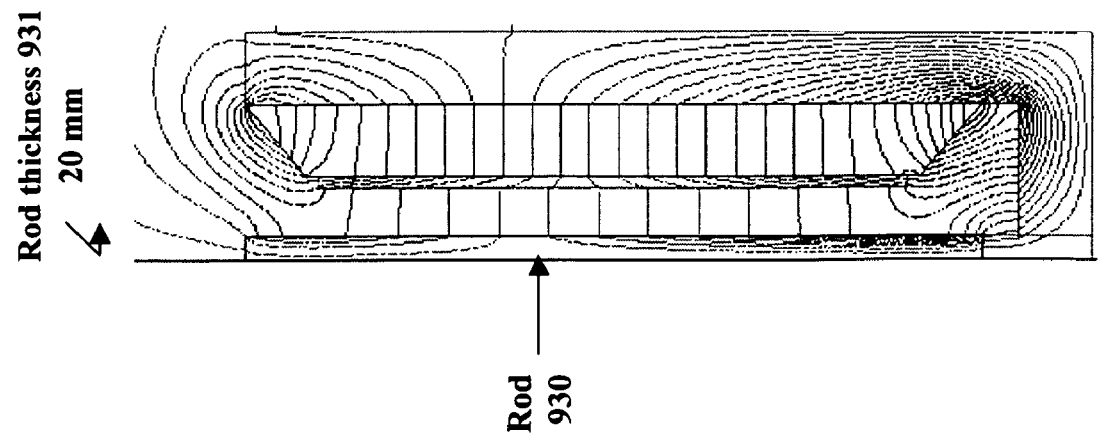
Figure 16B:
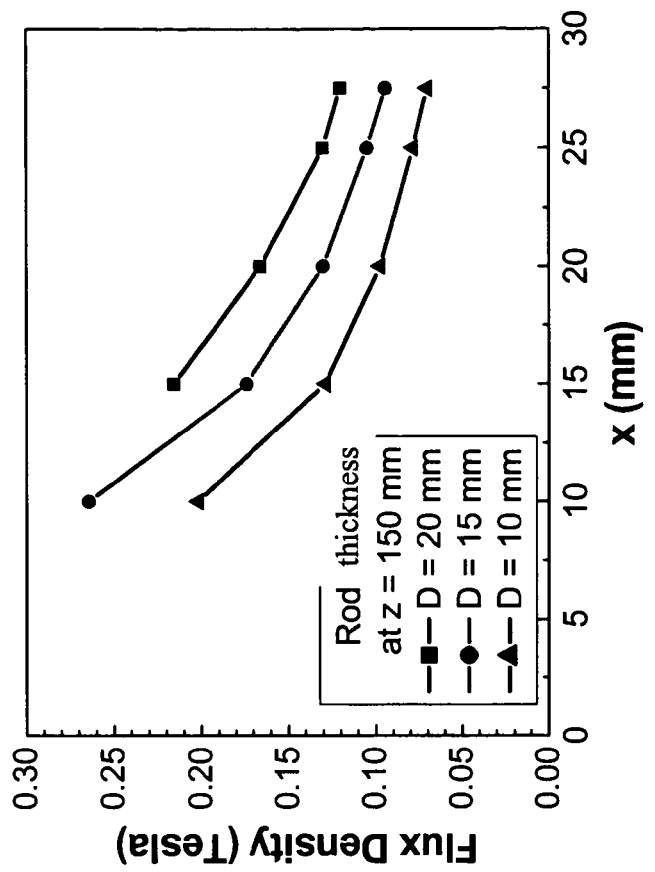
FIGS. 16A and 16B illustrate the effect of one embodiment of a soft magnet rod thickness on radial magnetic field strength.
Figure 16A:
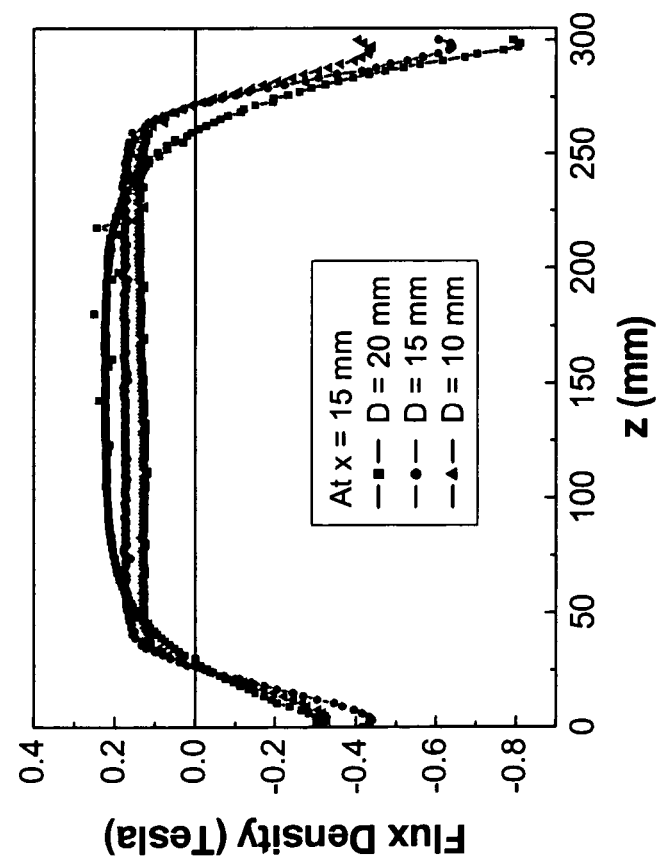
Figure 17A:
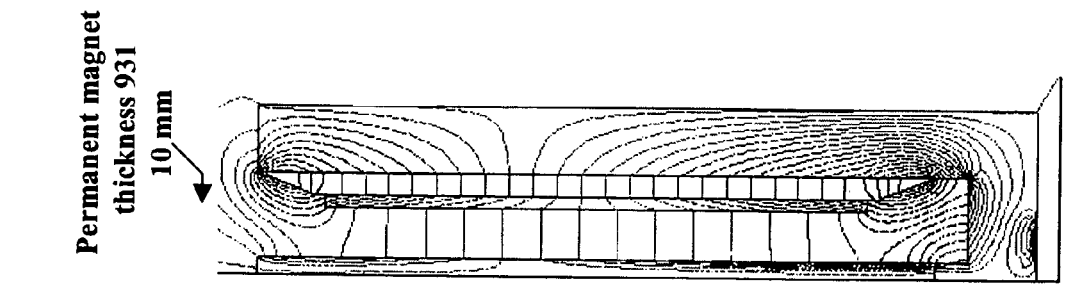
FIGS. 17A-17D illustrate the effect of one embodiment of a permanent magnet thickness on magnetic field distribution.
Figure 17B:
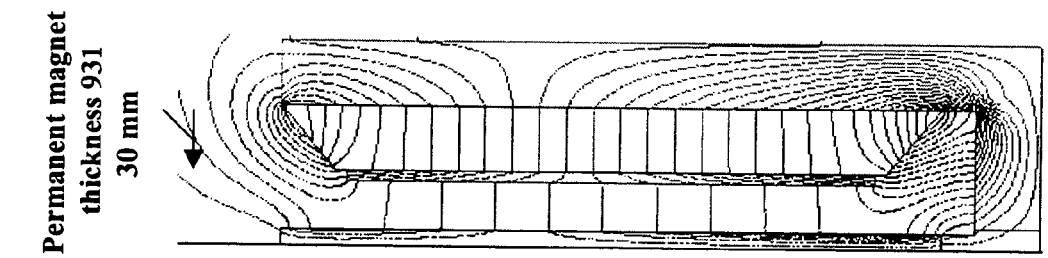
Figure 17C:
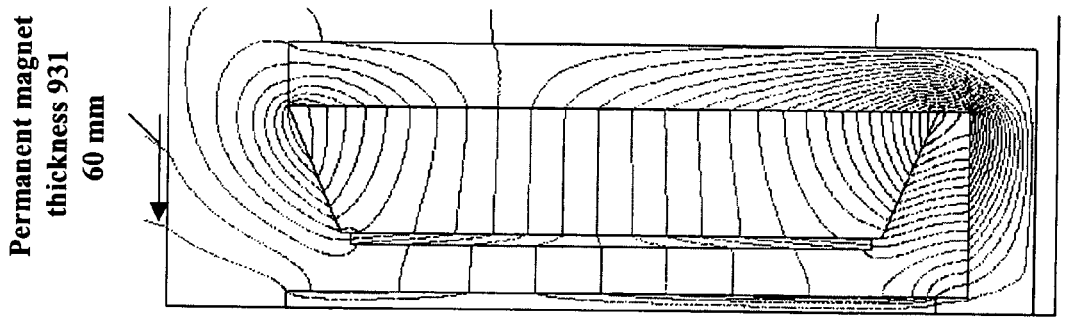
Figure 17D:
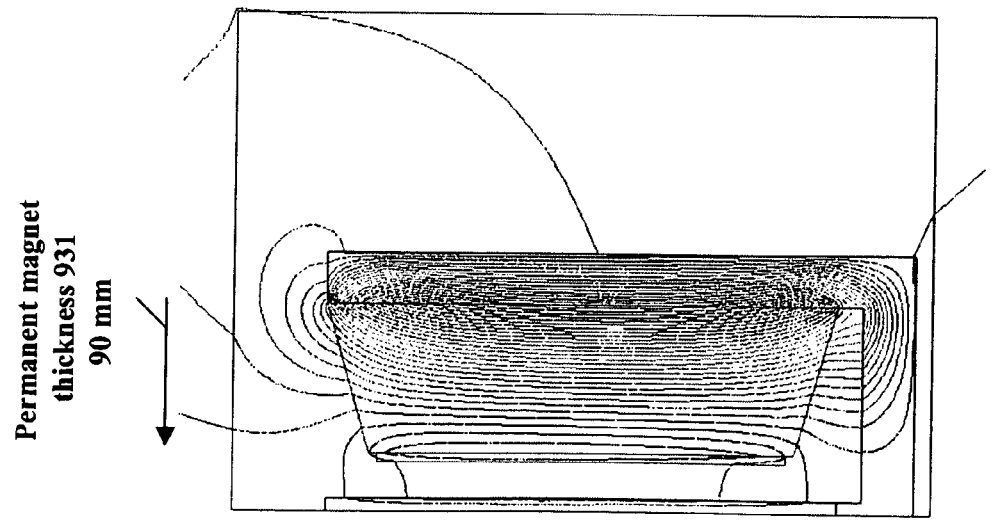

FIGS. 15A-15C illustrate the effect of one embodiment of a soft magnet rod 930 thickness 931 on magnetic field distribution. All of the illustrated radial magnetic field distributions are for a radial magnetic field reset apparatus 900 having a cavity radius of 30 mm, a permanent magnet 940 with a 30 mm thickness 941, and a soft magnetic member 949 with a 5 mm thickness 921. FIGS. 16A and 16B illustrate the effect of the rod thickness 931 on the radial magnetic field strength. The flux density data of FIGS. 16A and 16B are for a radial magnetic field reset apparatus 900 having a cavity radius of 30 mm, a soft magnet rod 930 with a 10-20 mm thickness 931, a permanent magnet 940 with a 30 mm thickness 941, and a soft magnetic member 949 with a 5 mm thickness 921. FIG. 16A shows that the uniform field area may increase with a decrease in the rod thickness 931. As can be seen from FIG. 16B, as the rod thickness 931 decreases, the radial magnetic field strength is reduced because of the saturation effect on the soft magnet rod 930.

Figure 18B:
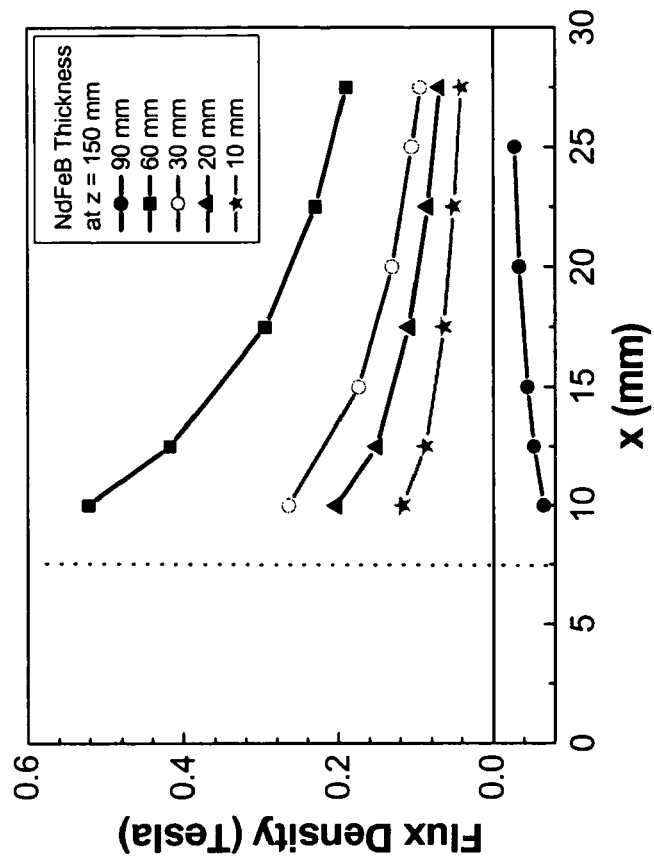
FIGS. 18A and 18B illustrate the effect of one embodiment of a permanent magnet thickness on radial magnetic field strength.
Figure 18A:
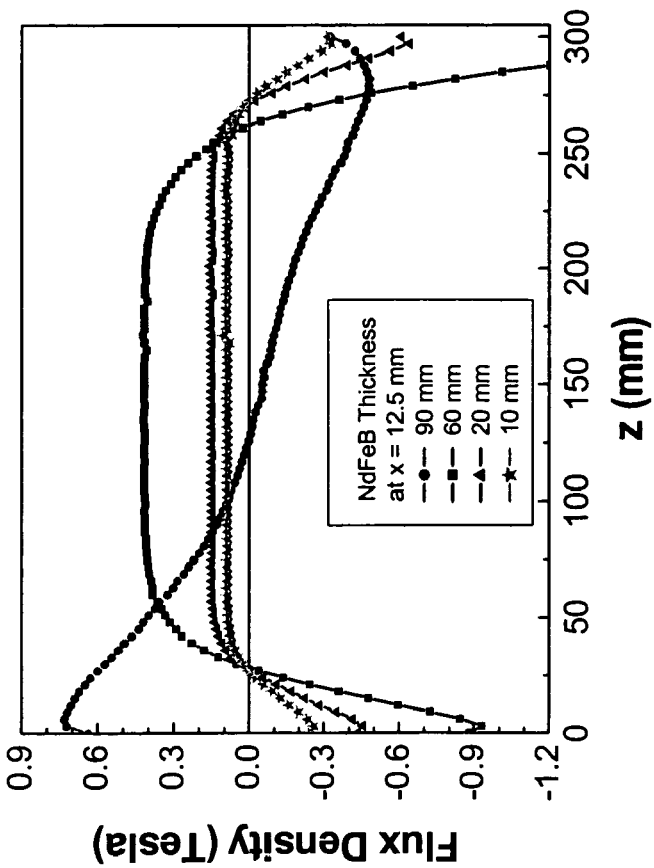

FIGS. 17A-17D illustrate the effect of one embodiment of permanent magnet 940 (e.g., NdFeB) thickness 941 on magnetic field distribution. All of the illustrated magnetic field distributions are for a radial magnetic field reset apparatus 900 having a cavity radius of 30 mm, a soft magnet rod 930 with a 15 mm thickness 931, a permanent magnet 940 with a 10-90 mm thickness 941, and a soft magnetic member 949 with a 5 mm thickness 948. As the permanent magnet 940 thickness 941 is increased from 10 to 60 mm, the radial magnetic field distributions are not changed. However, significant change in the field distribution is obtained at a 90 mm thickness of permanent magnet 940. Two magnetic paths are created. Magnetic fluxes from the permanent magnet 940 no longer pass through the soft magnet rod 930. As shown in FIGS. 18A and 18B, the radial magnetic field strength is continuously increased when the permanent magnet 940 thickness 941 is increased from 10 to 60 mm. The negative field strength is also increased at Z=0 (the entrance to the cavity). A thickness of the permanent magnet 940 may be limited, in this embodiment, to 90 mm due to formation of two magnetic flux return paths. Thus, the field strength is significantly decreased and a poor field distribution is observed.

The saturation of the soft magnet rod 930 at its center may contribute to reduction of the radial magnetic field strength 980, reduction in the zone along the length 932 of the rod having a uniform radial magnetic field (the uniform radial magnetic field zone), and the existence of an opposite field direction in the front (open side) of the cavity. In one embodiment, in order to decrease the opposite field strength in front of the cavity during loading/unloading of cassette 960, the length 932 of the soft magnet rod 930 may be decreased. A decrease in the length 932 of the soft magnet rod 930 will reduce the uniform radial magnetic field zone. Thus, extension of the length 942 of the permanent magnet 940 may be needed. For further reduction of opposite field strength in front of the cavity, the permanent magnet 940 may have a tapered edge 947 (as shown and discussed in relation to FIGS. 9C and 23).

Figure 19:
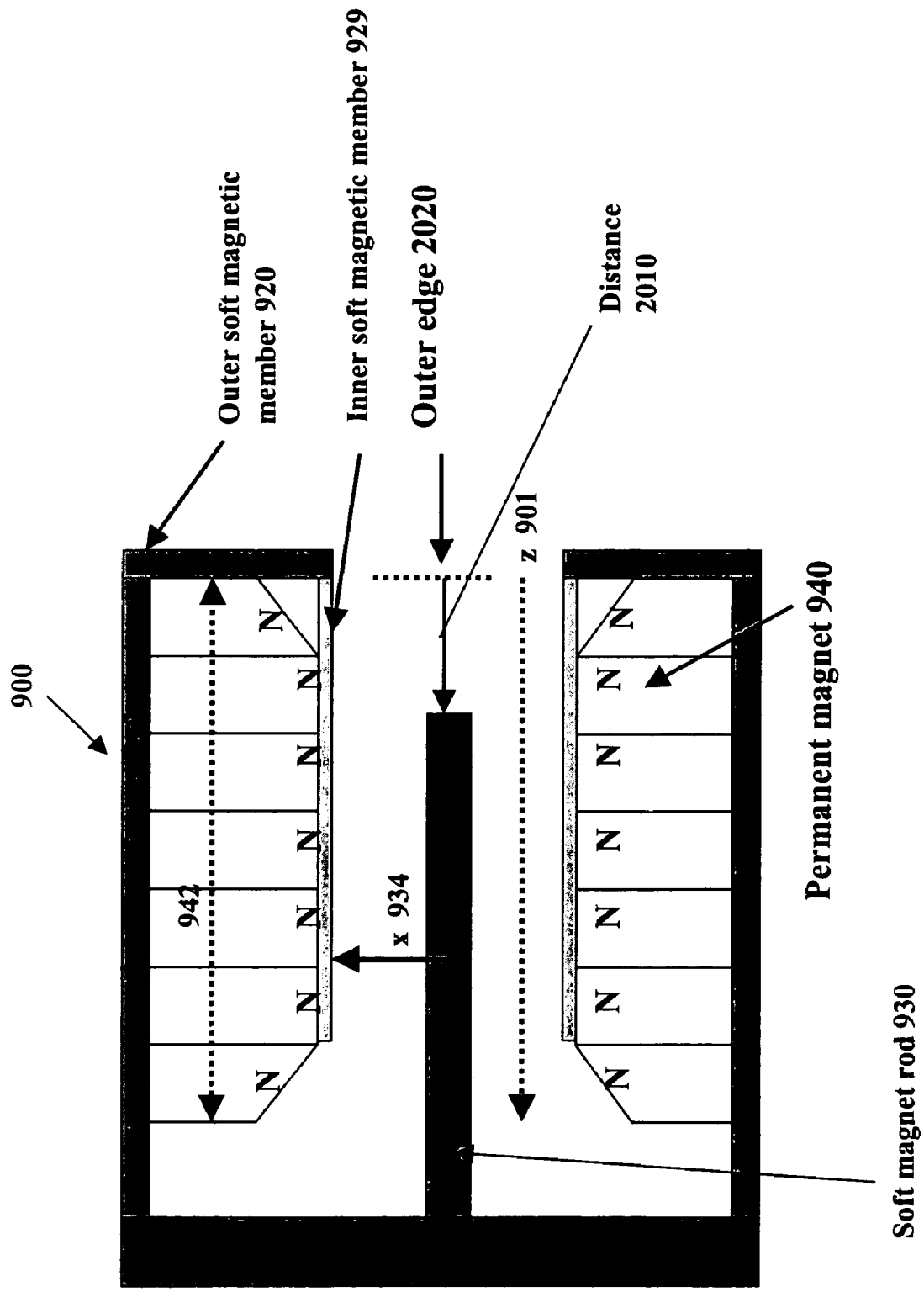
FIG. 19 is a side sectional view illustrating an alternative embodiment of a radial magnetic field reset apparatus.
Figure 20A:
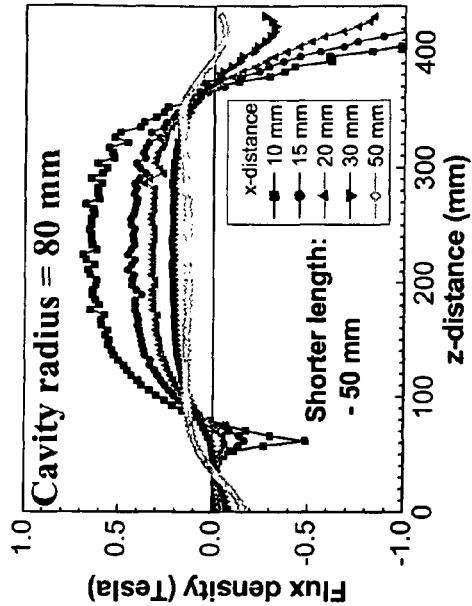
FIGS. 20A-20D illustrate the magnetic flux patterns with decreasing length of one embodiment of a soft magnet rod for different cavity radius.
Figure 20B:
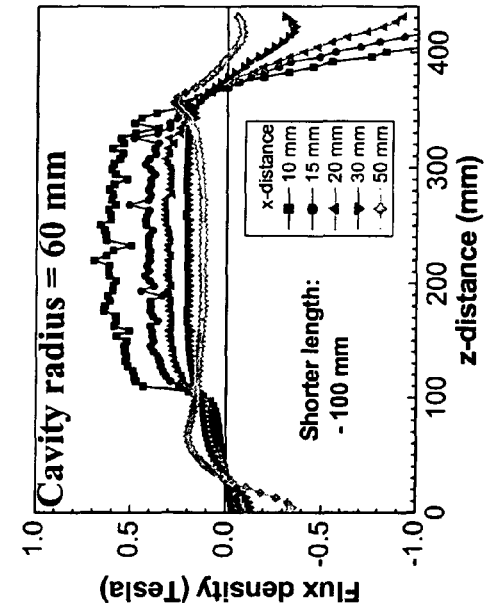
Figure 20C:
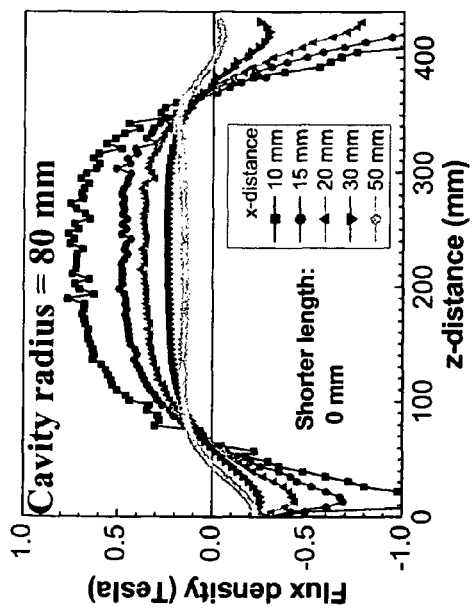
Figure 20D:
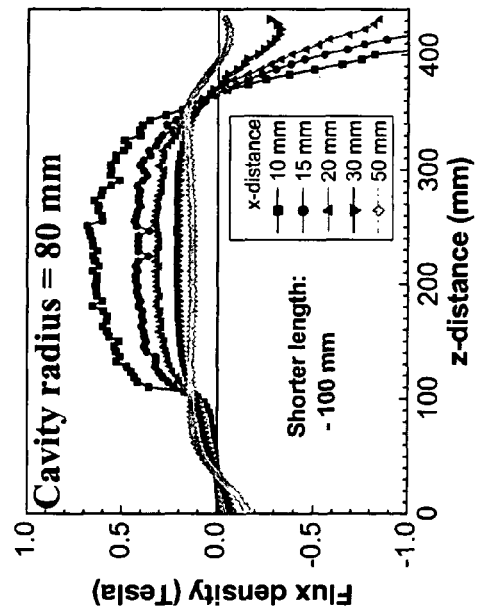

FIG. 19 is a side sectional view illustrating an alternative embodiment of a radial magnetic field reset apparatus. In this embodiment, radial magnetic field reset apparatus 900 includes a soft magnet rod 930 having a length 932 that terminates before the front end of the cavity. In particular, the cavity end of the soft magnet rod 932 is disposed a distance 2010 away from the outer edge 2020 of the permanent magnet 940. In one embodiment, distance 2010 may be approximately in a range of 0 to 100 mm. It should be noted that the mechanical support structure of apparatus 900 has been omitted from FIG. 20 for clarity.

Figure 21:
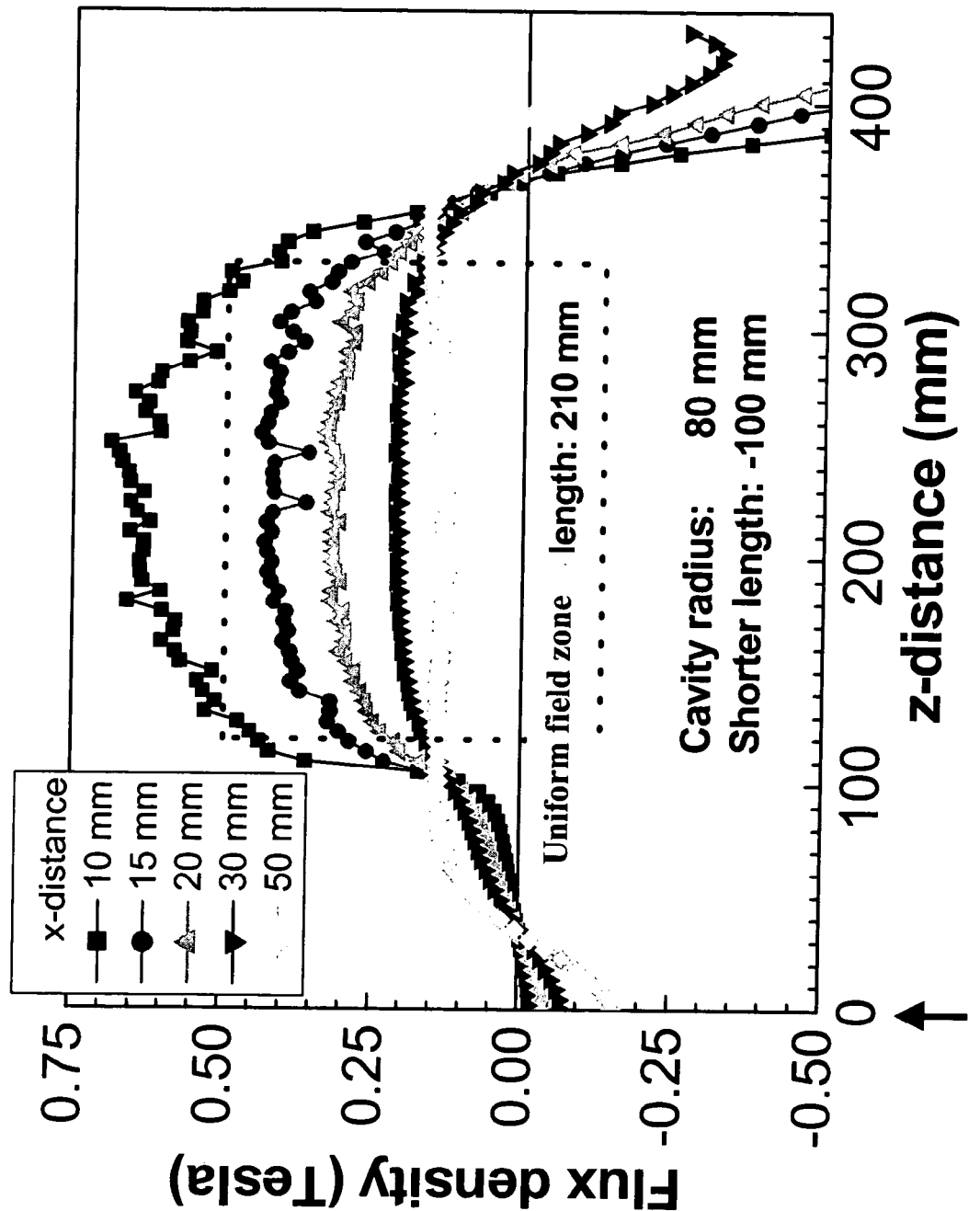
FIG. 21 illustrates one embodiment of a uniform field zone length for radial magnetic field reset apparatus 900.
Figure 22:
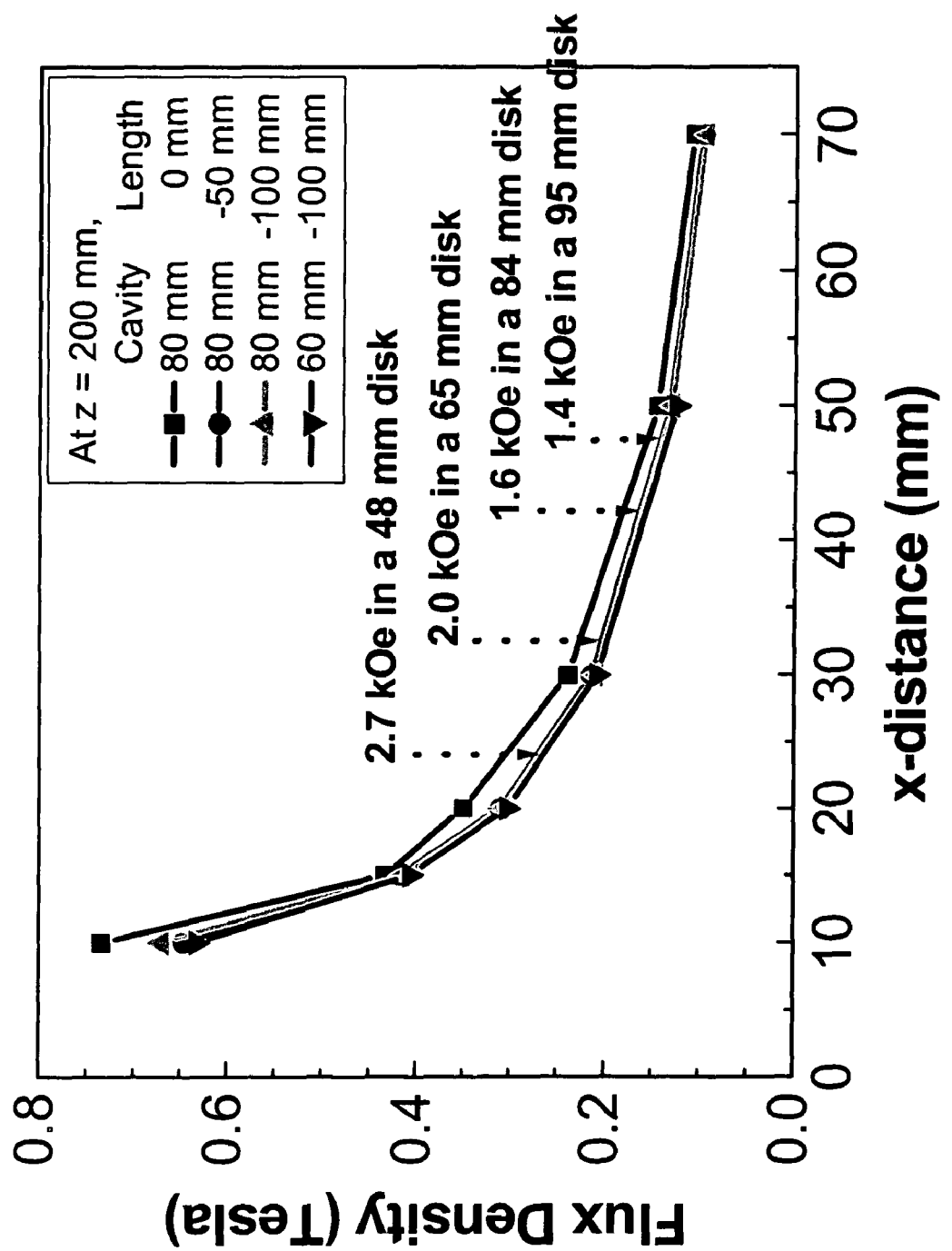
FIG. 22 illustrates embodiments of radial magnetic field strength with decreasing length of a soft magnet rod for various exemplary radii of a disk.

FIGS. 20A-20D illustrate the magnetic flux patterns with decreasing length of one embodiment of a soft magnet rod for different cavity radius. The flux density data of FIGS. 20A-20D are for a radial magnetic field reset apparatus 900 having a cavity radius of 60 and 80 mm, a permanent magnet 940 with a 60 mm thickness 941 and a 400 mm length 942, and a soft magnetic member 949 with a 5 mm thickness 948. As can be seen from FIGS. 20C and 20D, with a shorter length rod 930 whose end is at a distance 2010 of approximately 100 mm from the outer edge 2020 of the permanent magnet 940, there is little flux density at the cavity opening (near z=0) for both cavity radii of 80 and 60 mm, respectively, relative to the negative flux densities in this region exhibited in FIGS. 20A and 20B. FIG. 21 illustrates one embodiment of a uniform field zone length for radial magnetic field reset apparatus 900. In this embodiment, with a cavity radius of approximately 80 mm and a short rod length (i.e., distance 2010 of approximately 100 mm), the radial magnetic field reset apparatus 900 may have a uniform field zone length of approximately 210 mm. Alternatively, radial magnetic field reset apparatus 900 may have other uniform field zone lengths. FIG. 22 illustrates the radial magnetic field strength with decreasing length (i.e., increasing distance 2010) of the soft magnet rod 930 for various exemplary radii of a disk.

Figure 23:
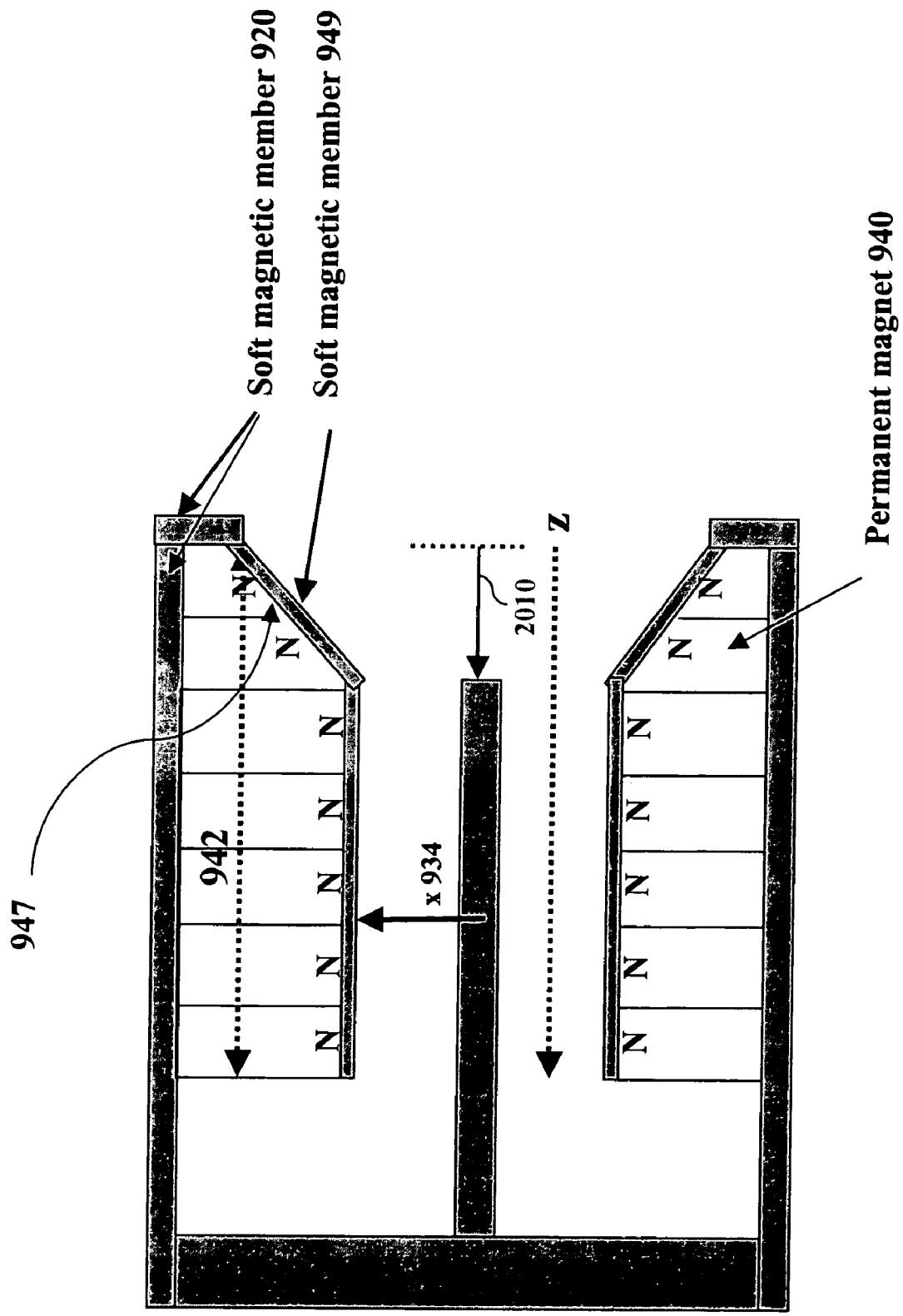
FIG. 23 illustrates an alternative embodiment of is a side sectional view illustrating an alternative embodiment of a radial magnetic field reset apparatus with a permanent magnet having a cut edge at a cavity entrance.

FIG. 23 illustrates an alternative embodiment of is a side sectional view illustrating an alternative embodiment of a radial magnetic field reset apparatus with a permanent magnet having a cut edge at a cavity entrance. In this embodiment, radial magnetic field reset apparatus 900 includes a permanent magnet 940 having a tapered edge 947 in order to reduce the opposite field strength generated by the apparatus at the cavity entrance as previously discussed. In this embodiment, the inner soft magnet member 949 is also disposed over the tapered edge 947 though need not necessarily be so. It should be noted that the mechanical support structure of apparatus 900 has been omitted from FIG. 23 for clarity.

Although the radial magnetic field reset apparatus 900 has been described above in regards to certain thickness soft magnet rods (e.g., 10 mm and 20 mm) that can be used with certain disk form factors (e.g., 20 mm and 25 mm IDs), the radial magnetic field reset apparatus may also be designed for use with other disk form factors (e.g., a disk with a 7 mm ID). Furthermore, although the radial magnetic field reset apparatus has been described above in regards to use with HM-based SUL disks for ease of discussion, the radial magnetic field reset apparatus may be used with other types of SAF SUL perpendicular recording disks.

In the foregoing specification, the present invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. A method, comprising:
   generating a substantially radial magnetic field over a plurality of disks with respect to a center of each of the plurality of disks, each of the plurality of disks comprising a soft magnetic underlayer (SUL) structure; and
   concurrently inducing a substantially single domain state in the SUL structure of each of the plurality of disks using the substantially radial magnetic field, wherein generating the substantially radial magnetic field over the plurality of disks comprises:
      providing a soft magnet rod within respective inner diameter holes of the plurality of disks; and
      providing a permanent magnet outside of respective outer diameters of the plurality of disks to generate a magnetic field, wherein the soft magnetic rod attracts the magnetic field from the permanent magnet to generate the substantially radial magnetic field over the plurality of disks.

2. The method of claim 1, wherein each of the plurality of disks further comprises a hard magnetic pinning layer and wherein the SUL structure comprises a soft ferromagnetic film.

3. The method of claim 2, wherein the substantially radial magnetic field has a strength in approximately a range of 1000 Oe to 6000 Oe.

4. The method of claim 2, wherein inducing the substantially single domain state in the SUL structure of the plurality of disks comprises:
   aligning the hard magnetic pinning layer of each of the plurality of disks in a substantially uniform radial direction using the substantially radial magnetic field; and
   providing a bias field to the SUL structure of each of the plurality of disks using the aligned hard magnetic pinning layer to induce the substantially single domain state in the soft ferromagnetic film.

5. The method of claim 1, wherein the substantially radial magnetic field has a strength greater than approximately 500 Oe.

6. The method of claim 1, wherein the substantially radial magnetic field has a strength of approximately 1500 Oe or greater.

7. The method of claim 1, further comprising providing the plurality of disks in a completed fabrication state prior to inducing the substantially single domain state in the SUL structure of each of the plurality of disks using the substantially radial magnetic field.

8. The method of claim 1, wherein the substantially radial magnetic field extends along a direction perpendicular to a diameter of each of the plurality of disks for a distance greater than a combined thickness of all of the plurality of disks.

9. A method, comprising:
   disposing a soft magnet rod within an inner diameter hole of a magnetic recording disk comprising a soft magnetic underlayer (SUL) structure;
   disposing a permanent magnet outside of an outer diameter edge of the disk;
   generating a substantially radial magnetic field over the magnetic recording disk, with respect to a center of the magnetic recording disk, using the soft magnet rod and the permanent magnet; and
   inducing a substantially single domain state in the SUL structure of the magnetic recording disk using the substantially radial magnetic field.

10. The method of claim 9, wherein the soft magnet rod is maintained out of physical contact with the magnetic recording disk.

11. The method of claim 9, wherein the substantially radial magnetic field has a strength greater than approximately 500 Oe.

12. The method of claim 10, wherein the substantially radial magnetic field has a strength of approximately 1500 Oe or greater.

13. The method of claim 9, further providing the magnetic recording disk in a completed fabrication state prior to disposing the soft magnet rod within the inner diameter hole of the magnetic recording disk.

14. A method, comprising:
   disposing a soft magnet rod within an inner diameter hole of a magnetic recording disk comprising a soft magnetic underlayer (SUL) structure;
   disposing a permanent magnet outside of an outer diameter edge of the disk;
   generating a substantially radial magnetic field over the magnetic recording disk, with respect to a center of the magnetic recording disk, using the soft magnet rod and the permanent magnet; and
   inducing a substantially single domain state in the SUL structure of the magnetic recording disk using the substantially radial magnetic field, wherein the magnetic recording disk further comprises a hard magnetic pinning layer and wherein the SUL structure comprises a soft ferromagnetic film.

15. The method of claim 14, wherein inducing the substantially single domain state in the SUL structure comprises:
   aligning the hard magnetic pinning layer in a substantially uniform radial direction using the substantially radial magnetic field; and
   providing a bias field to the SUL using the aligned hard magnetic pinning layer to induce the substantially single domain state in soft ferromagnetic film.

16. The method of claim 14, wherein the substantially radial magnetic field has a strength in approximately a range of 1000 Oe to 6000 Oe.

\* \* \* \* \*